(12) United States Patent
Rewerts et al.

(10) Patent No.: US 11,840,353 B2
(45) Date of Patent: Dec. 12, 2023

(54) RAM AIR TURBINE INSTALLATION ALLOWING LOW SPEED FLIGHT

(71) Applicant: ZSM HOLDINGS LLC, Dover, DE (US)

(72) Inventors: Scott David Rewerts, Summerfield, NC (US); Mathew J. Isler, Sammamish, WA (US)

(73) Assignee: ZSM Holdings LLC, Dover, DE (US)

( * ) Notice: Subject to any disclaimer, the term of this patent is extended or adjusted under 35 U.S.C. 154(b) by 0 days.

(21) Appl. No.: 18/027,827

(22) PCT Filed: Sep. 23, 2021

(86) PCT No.: PCT/US2021/051841
§ 371 (c)(1),
(2) Date: Mar. 22, 2023

(87) PCT Pub. No.: WO2022/093452
PCT Pub. Date: May 5, 2022

(65) Prior Publication Data
US 2023/0271717 A1  Aug. 31, 2023

Related U.S. Application Data

(60) Provisional application No. 63/082,287, filed on Sep. 23, 2020.

(51) Int. Cl.
*B64D 41/00* (2006.01)
*B64C 3/14* (2006.01)
*B64C 1/20* (2006.01)

(52) U.S. Cl.
CPC .............. *B64D 41/007* (2013.01); *B64C 1/20* (2013.01); *B64C 3/14* (2013.01)

(58) Field of Classification Search
CPC ...................................................... B64D 1/007
See application file for complete search history.

(56) References Cited

U.S. PATENT DOCUMENTS 1,495,036 A * 5/1924 Palmer .................. B64D 27/04
415/908
2,095,440 A 10/1937 Hojnowski
(Continued)

OTHER PUBLICATIONS

"Emirates A 380 with active ram air turbine landing at Hamburg Finkenwerder" uploaded by walkbyfeet, May 30, 2013 [retrieved May 12, 2022]. Retrieved from the internet: https://youtu.be/2BAqp7oh6Wg.
(Continued)

*Primary Examiner* — Joshua J Michener
*Assistant Examiner* — Michael B. Kreiner
(74) *Attorney, Agent, or Firm* — Barnes & Thornburg LLP

(57) ABSTRACT

An installation configuration for a ram air turbine on an aircraft arranged to operate during a low speed operation. An example aircraft includes a fuselage and a lifting body connected to the fuselage and configured to provide a lifting force on the fuselage, the lifting body including a suction surface and a pressure surface disposed on opposite sides of the lifting body from each other, the suction surface extending from a leading edge of the lifting body to a trailing edge of the lifting body. A ram air turbine is coupled to the lifting body and configured to move between a retracted position where the ram air turbine is stowed inside the aircraft and an extended position where the ram air turbine is disposed above the suction surface of the lifting body.

34 Claims, 25 Drawing Sheets

(56) References Cited

U.S. PATENT DOCUMENTS

| | | | |
|---|---|---|---|
| 2,134,260 | A | 10/1938 | Nickerson |
| 2,425,499 | A | 8/1947 | Watter |
| 2,425,972 | A | 8/1947 | Watter |
| 2,942,812 | A | 6/1960 | Pauli |
| 2,998,948 | A | 9/1961 | Sisk |
| 3,374,972 | A | 3/1968 | Webb, Sr. |
| 3,785,593 | A | 1/1974 | Scolatti et al. |
| 3,972,427 | A | 8/1976 | Stanley et al. |
| 4,621,780 | A | 11/1986 | Doyhamboure et al. |
| 5,069,402 | A | 12/1991 | Wortman |
| 5,150,859 | A * | 9/1992 | Ransick ............... B64C 23/065 290/55 |
| 8,121,786 | B2 | 2/2012 | Morbey et al. |
| 8,708,282 | B2 | 4/2014 | Helou, Jr. |
| 9,828,110 | B2 * | 11/2017 | Roques .................... F03D 9/32 |
| 9,970,526 | B1 | 5/2018 | Bortoli et al. |
| 10,829,240 | B2 * | 11/2020 | Bortoli ..................... F02C 7/32 |
| 11,014,687 | B2 * | 5/2021 | Barreiro Rodriguez .. B64C 1/16 |
| 11,292,356 | B2 * | 4/2022 | Siegmeth ............... B64C 9/323 |
| 11,492,094 | B2 | 11/2022 | Rewerts et al. |
| 2002/0079403 | A1 | 6/2002 | Boe |
| 2004/0200930 | A1 | 10/2004 | Bays-Muchmore et al. |
| 2009/0173824 | A1 | 7/2009 | Perez-Sanchez |
| 2010/0252682 | A1 | 10/2010 | Pahl |
| 2015/0183519 | A1 | 7/2015 | Llamas Sandin |
| 2016/0311512 | A1 | 10/2016 | Sankrithi |
| 2018/0273176 | A1 | 9/2018 | Paunicka et al. |
| 2020/0207475 | A1 | 7/2020 | Dobberfuhl et al. |
| 2021/0129972 | A1 | 5/2021 | Sankrithi et al. |
| 2021/0371105 | A1 | 12/2021 | Rewerts |
| 2021/0380218 | A1 | 12/2021 | Rewerts et al. |
| 2021/0380245 | A1 | 12/2021 | Rewerts et al. |
| 2021/0380247 | A1 | 12/2021 | Bell et al. |
| 2022/0024589 | A1 | 1/2022 | Karni et al. |

OTHER PUBLICATIONS

Atlas shoulders the load. Datasheet [online]. Tim Robinson, Jan. 2, 2018 [retrieved on May 12, 2022] retrieved from the internet: https://www.aerosociety.com/news/atlas-shoulders-the-load/.

Concorde RAT (Ram air turbine). Datasheet [online]. Heritage Concorde, Aug. 1, 2015 [retrieved on May 10, 2022]. Retrieved from the internet: https://www.heritageconcorde.com/concorde-rat.

Future of Air Cargo: The 747-8 Series Have Very Little in Common with Original 747s. Datasheet [online]. Mangoworldmagazine Aug. 4, 2013 [retrieved on May 12, 2022]. Retrieved from the internet: mangoworldmagazine.blogspot.com/2013/08/future-of-air-cargo-747-8-series-have.html.

International Search Report and Written Opinion for Application No. PCT/US2021/51841, dated Jul. 25, 2022 (9 pages).

International Search Report and Written Opinion for Application No. PCT/US2020/49787, dated Nov. 30, 2020 (20 pages).

International Search Report and Written Opinion for Application No. PCT/US2021/021792, dated May 20, 2021 (12 Pages).

No Author Listed. "747-400/-400ER Freighters" StartupBoeing. May 2010.

"No Author Listed. Antonov Airlines Brochure. Jul. 2019. [online] retrieved from <URL: https://www.antonov-airlines.com/wp-content/uploads/2019/07/Antonov-Airlines- brochure.pdf>".

No Author Listed. C-130J Super Hercules Brochure, Lockheed Martin.

No Author Listed. DHC-4 A Caribou Brochure, The De Havilland Canada. Nov. 1962.

No Author Listed. Piasecki H-21 Helicopter, Wikipedia. Website. Accessed Oct. 29, 2021. url: <https://en.wikipedia.org/wiki/Piasecki_H-21>.

Boeing 747-800 Ram Air Turbine Doors in Flight.

Boeing 747-800 Ram Air Turbine Door Extended.

Boeing 747-800 Ram Air Turbine Doors.

* cited by examiner

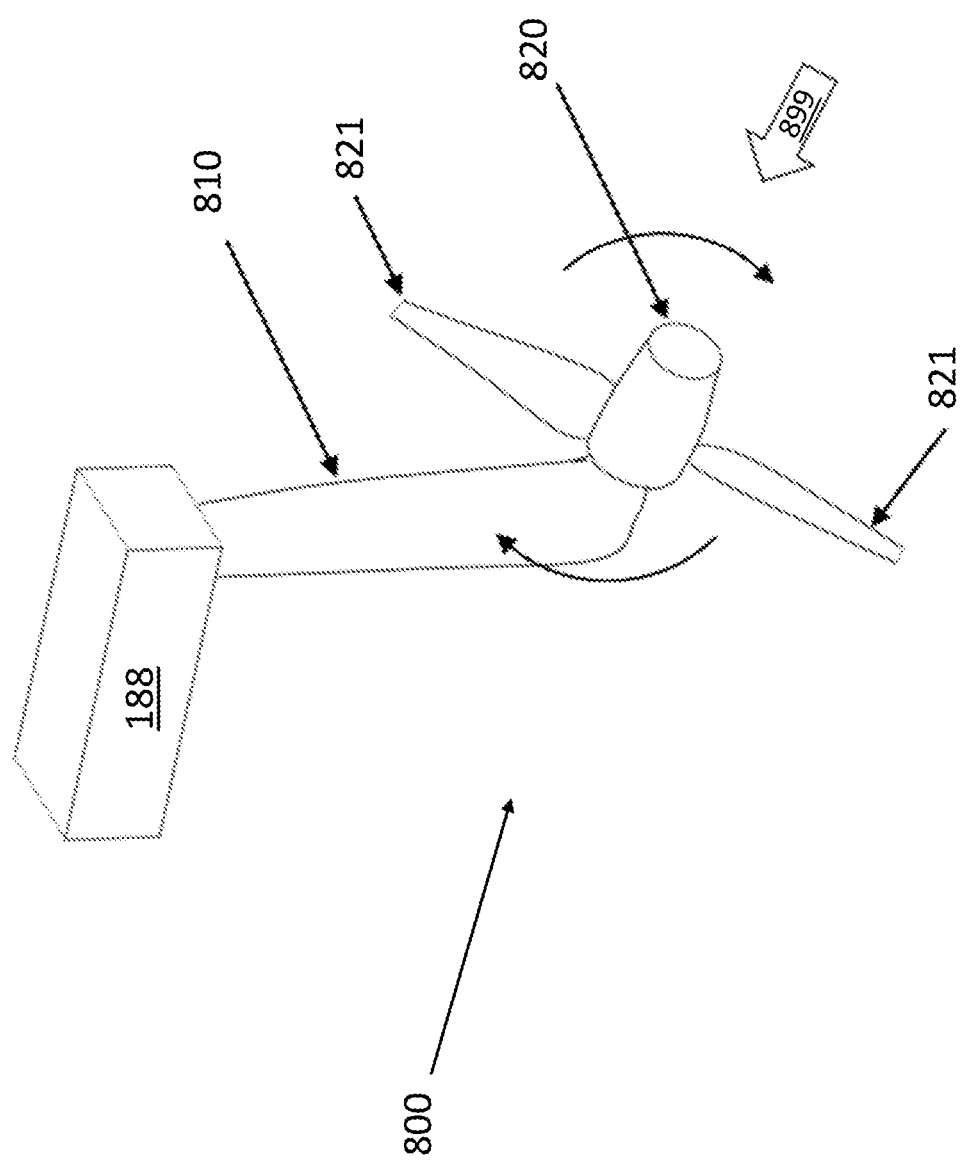

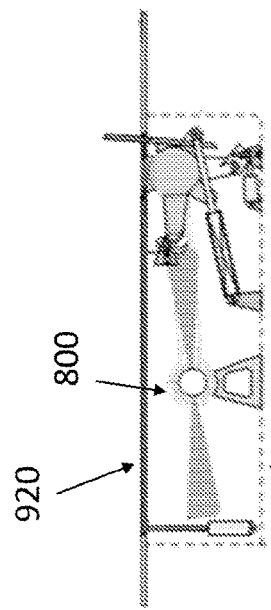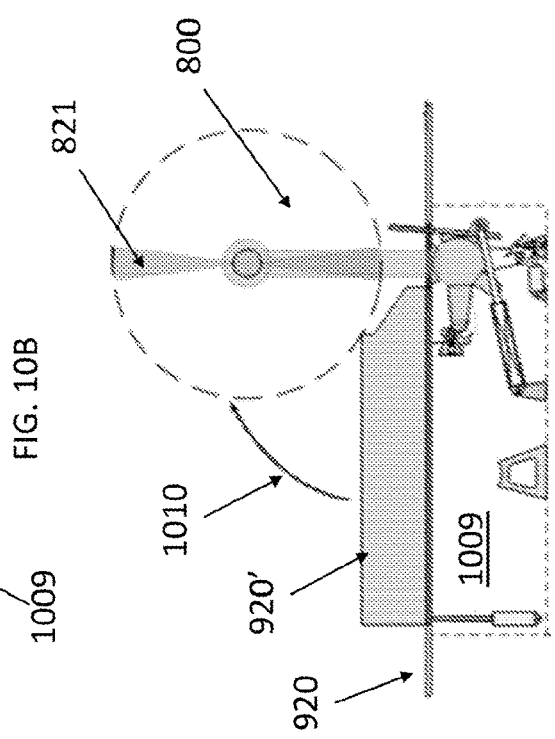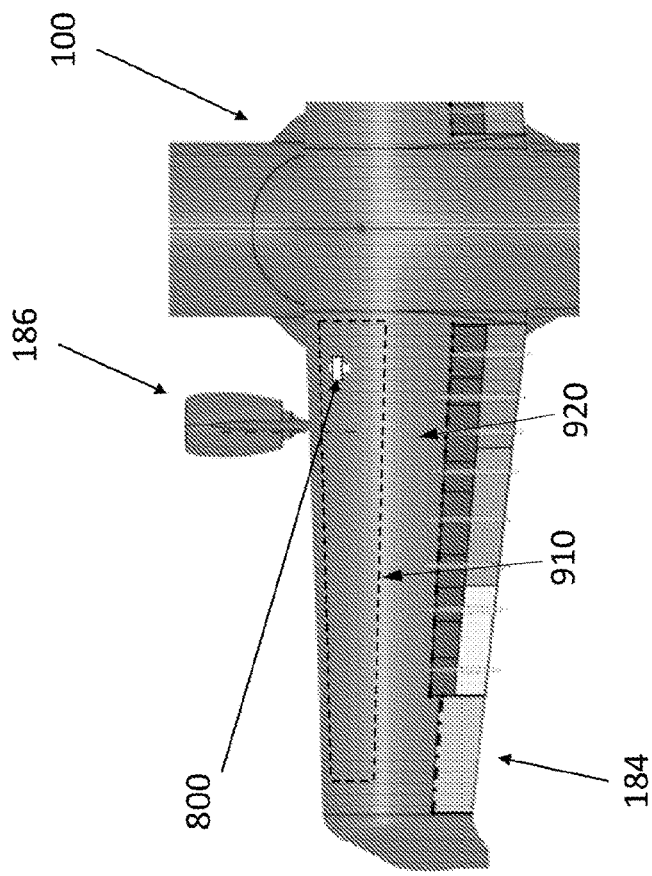

RAM AIR TURBINE INSTALLATION ALLOWING LOW SPEED FLIGHT

CROSS-REFERENCE TO RELATED APPLICATIONS

This application is a U.S. national counterpart application of PCT International Application No. PCT/US2021/051841 filed Sep. 23, 2021, which claims priority to and the benefit of U.S. Provisional Application Ser. No. 63/082,287, entitled "RAM AIR TURBINE INSTALLATION ALLOWING LOW SPEED FLIGHT," and filed Sep. 23, 2020, the contents of which is incorporated by reference herein in its entirety.

FIELD

The present disclosure relates to ram air turbine installations located on the suction side of lifting surfaces that allow for flight at very low speeds while maintaining the capability to generate power with the ram air turbine.

BACKGROUND

Renewable energy remains an increasingly important resource year-over-year. While there are many forms of renewable energy, wind energy has increased an average of about 19 percent annually since 2007. The increase in global demand in recent years for more wind energy has catalyzed drastic advances in wind turbine technology, including the development of larger, better-performing wind turbines. Better-performing wind turbines can at least sometimes mean larger turbines, as generally turbines with larger rotor diameters can capture more wind energy. As turbines continue to improve in performance and efficiency, more and more wind farm sites in previously undeveloped locations become viable both onshore and offshore. These sites may also be existing sites, where older turbines need replacement by better-performing, more efficient turbines, and new sites.

A limiting factor to allow for the revitalization of old sites and development of new sites is transporting the wind turbines, and related equipment, to the sites. Wind turbine blades are difficult to transport long distances due to the terrestrial limitations of existing air vehicles and roadway infrastructures. Onshore transportation has traditionally required truck or rail transportation on existing infrastructure. Both roads and railways are limited by height and width of tunnels and bridges. Road transport has additional complications of lane width, road curvature, and the need to pass through urban areas that may require additional permitting and logistics, among other complications. Offshore transportation by ship is equally, if not more so, limiting. For example, delivery of parts can be limited to how accessible the offshore location is by ship due to various barriers (e.g., sand bars, coral reefs) and the like in the water and surrounding areas, as well as the availability of ships capable of handling such large structures.

Whether onshore or offshore, the road vehicle or ship options for transporting such equipment has become more limited, particularly as the size of wind turbines increase. Delivery is thus limited by the availability of vehicles and ships capable of handling such large structures. The very long lengths of wind turbine blades (some are presently 90 meters long, 100 meters long, or even longer) make conventional transportation by train, truck, or ship very difficult and complicated. Unfortunately, the solution is not as simple as making transportation vehicles longer and/or larger. There are a variety of complications that present themselves as vehicles are made longer and/or larger, including but not limited to complications of: load balancing of the vehicle; load balancing the equipment being transported; load balancing the two with respect to each other; handling, maneuverability, and control of the vehicle; and other complications that would be apparent to those skilled in the art.

Further, whether onshore or offshore, delivery of parts can be slow and severely limited by the accessibility of the site. Whether the site being developed is old or new, the sites can often be remote, and thus not near suitable transportation infrastructure. The sites may be far away from suitable roads and rails (or other means by which cargo may be transported) to allow for easy delivery of cargo for use in building the turbines at the site and/or other equipment used in developing the site. New sites are often in areas without any existing transportation infrastructure at all, thus requiring new construction and special equipment. Ultimately, transportation logistics become cost prohibitive, resulting in a literal and figurative roadblock to further advancing the use of wind energy on a global scale.

Existing cargo aircraft, including the largest aircraft ever to fly, are not able to transport extremely large cargo, even if that cargo is, in all dimensions, smaller than the aircraft itself. This limitation is often the result of cargo aircraft, even those purpose built to be cargo aircraft, not fully utilizing their overall size as cargo bay volume. This constraint has many causes, one of which is related to the ability of the aircraft to takeoff and land without excessive runway length. Larger and heavier aircraft take more energy to accelerate during takeoff, as well are more energy to decelerate upon landing. Accordingly, traditional solutions involve increasing the lift provided by the aircraft's lifting surfaces to allow the aircraft to get off the ground at a slower speed and, conversely, to allow the aircraft to approach the runway at a slower speed (while still being able to abort and climb, if necessary).

One difficulty for large aircraft reducing their takeoff and landing speeds is meeting the regulations for maintaining aircraft control capabilities in the event of an emergency due to loss of electrical of hydraulic power. For example, in the United States, "The airplane must be designed so that it is controllable if all engines fail. Compliance with this requirement may be shown by analysis where that method has been shown to be reliable." By controllability, one skilled in the art may infer that the intent includes controllability whenever the aircraft remains flying, including controllability down to landing speeds. Examples of emergencies which may cause a full power loss is dual engine failures on a twin-engine aircraft, or engine fuel starvation scenarios impacting all engines, such as running out of fuel, or contaminated fuel.

A lightweight, inexpensive solution for maintaining aircraft control capabilities in the event of an emergency issue is a ram air turbine (RAT), a device that extracts energy from the passing airflow and converts it to either electricity (e.g., by turning a generator) or hydraulic power (e.g., by turning a pump), or mechanical power (e.g., turning a shaft), or any combination of electric, mechanical, and hydraulic power, to provide an alternate power for control capabilities on an aircraft when the primary power source is unavailable. However, as takeoff and landing speeds are reduced, the power available from a RAT is reduced as well.

Accordingly, there is a need for ram air turbine configurations capable of providing power at very low speeds in order to enable low speed takeoff and landing aircraft to meet government safety certifications.

SUMMARY

Certain examples of the present disclosure include aircraft fuselage designs for lowering the minimum takeoff and landing speed while maintain the ability to deploy a ram air turbine that can provide sufficient power to the aircraft during an emergency loss of power. Examples of the present disclosure include extremely large cargo aircraft capable of both carrying extremely long payloads and being able to take off and land at runways that are significantly shorter than those required by most, if not all, existing large aircraft, by having very slow minimum takeoff and landing speeds (e.g., less than 100 knots and even less than 60 knots). For purposes of the present disclosure, a large or long aircraft is considered an aircraft having a fuselage length from fuselage nose tip to fuselage tail tip that is at least approximately 60 meters long. The American Federal Aviation Administration (FAA) defines a large aircraft as any aircraft of more than 12,500 pounds maximum certificated takeoff weight, which can also be considered a large aircraft in the present context, but the focus of size is generally related to a length of the aircraft herein. One example of such an oversized payload capable of being transported using examples of this present disclosure are wind turbine blades, the largest of which can be over 100 meters in length. Examples of the present disclosure enable a payload of such an extreme length to be transported within the cargo bay of an aircraft having a fuselage length only slighter longer than the payload, while that aircraft can also take off and land at most existing commercial airports, as well as runways that are significantly smaller, for instance because they are built at a desired location for landing such cargo aircraft near a site where the cargo is to be used, such as a landing strip built near or as part of a wind farm.

In an exemplary embodiment, an aircraft includes a fuselage, a lifting body connected to the fuselage and configured to provide a lifting force on the fuselage, the lifting body including a suction surface and a pressure surface disposed on opposite sides of the lifting body from each other, the suction surface extending from a leading edge of the lifting body to a trailing edge of the lifting body, and a ram air turbine coupled to the lifting body and configured to move between a retracted position where the ram air turbine is stowed inside the aircraft and an extended position where the ram air turbine is disposed above the suction surface of the lifting body. The lifting body can include at least part of a wing of the aircraft and the suction surface can include an upper surface of the wing. In some examples, the, the wing includes a fuel tank, and the ram air turbine, in the retracted position, is stowed forward of the fuel tank. The ram air turbine can be stowed in the retracted position forward of a front spar of the wing. The wing can include at least one engine and the ram air turbine can be located along the wing at a location inboard of the at least one engine. In some examples, the suction surface of the lifting body is an upper surface. The ram air turbine can be configured to, in the extended position, provide at least one of electric power or hydraulic power to a corresponding electric system or hydraulic system of the aircraft during a flight operation of the aircraft.

The ram air turbine can include a plurality of turbine blades and an electrical generator configured to provide electric power to the aircraft or hydraulic pump configured to provide hydraulic pressure to the aircraft. In some examples, in the extend position, the ram air turbine is located closer to the leading edge of the lifting body than to the trailing edge of the lifting body. The lifting body can be sized and shaped such that, in an operation of the aircraft, the lifting body generates a region of accelerated airflow above the suction surface, an airspeed in the region of accelerated airflow being higher than an incoming airspeed forward of the leading edge, and the ram air turbine, in the extended position, is at least partially disposed in the region of accelerated airflow.

In some examples, the ram air turbine includes a plurality of turbine blades, and, when the ram air turbine is in the extended position, the plurality of turbine blades are disposed in the region of accelerated airflow.

The aircraft can be a fixed-wing aircraft. In some examples, the aircraft includes an interior cargo bay configured to carrying a maximum payload length of at least approximately 250 feet. In some examples, the aircraft is configured to have a minimum takeoff speed, and during a takeoff operation of the aircraft at the minimum takeoff speed, the ram air turbine in the extended position is at least partially disposed in a region of accelerated airflow having a velocity at least about 50% greater than the minimum takeoff speed. In some examples, the minimum takeoff speed is less than about 100 knots. In some examples, the ram air turbine in the extended position is at least partially disposed in a region of accelerated airflow having a velocity at least about 100% greater than the minimum takeoff speed.

In some examples, the aircraft is configured to have a minimum landing speed, and during a landing operation of the aircraft at the minimum landing speed, the ram air turbine in the extended position is at least partially disposed in a region of accelerated airflow having a velocity at least about 50% greater than the minimum landing speed. In some examples, minimum landing speed is less than about 100 knots. The ram air turbine in the extended position can be at least partially disposed in a region of accelerated airflow having a velocity at least about 25%, 50%, 75%, or 100% greater than the minimum landing speed. Examples includes disposing the ram air turbine in airflow regions up to 250% greater than the minimum landing speed, where the minimum landing speed can be 100 knots or lower.

In some examples, the ram air turbine is stowed, in the retracted position, in a lateral orientation or longitudinal orientation. In some examples, the ram air turbine is configured to rotate approximately about a chord or span of the lifting body to move between the retracted position and the extended position.

In one exemplary embodiment a cargo aircraft includes a fuselage defining a forward end, an aft end, and a continuous interior cargo bay that spans a majority of the length of the fuselage from the forward end to the aft end. The forward portion containing a forward region of the continuous interior cargo bay, the forward portion defining a forward centerline along a longitudinal-lateral plane of the cargo aircraft, the aft portion containing an aft region of the continuous interior cargo bay, the aft portion defining an aft centerline extending above the longitudinal-lateral plane of the cargo aircraft, and the cargo aircraft can further include a kinked portion forming a junction in the fuselage between the forward portion and the aft portion of the fuselage and between the forward and aft regions of the continuous interior cargo bay, the kinked portion containing a transition region of the continuous interior cargo bay and defining a bend angle between the forward centerline and the aft centerline. The cargo aircraft includes first fixed wing extending from the fuselage in a first direction away from the fuselage, a second fixed wing extending from the fuselage in a second direction away from the fuselage, the second direction approximately symmetric about a longitudinal-vertical center plane of the cargo aircraft, and a ram air turbine coupled the first fixed wing and configured to move between a retracted position where the ram air turbine is stowed inside the cargo aircraft and an extended position where the ram air turbine is disposed above a suction surface of the first fixed wing.

In some examples, the cargo aircraft has an upper wing configuration with an upper wing surface extending across the top of the aircraft from the first fixed wing to the second fixed wing, the upper wing surface comprising the suction surface of the first fixed wing. The length of the fuselage can be greater than 84 meters and the continuous interior cargo bay defines a maximum payload length of at least about 70 meters.

In some examples, the first fixed wing includes at least one engine, and the ram air turbine is located along the first fixed wing at a location inboard of the at least one engine. In the extended position, the ram air turbine can be located closer to the leading edge of the first fixed wing than to the trailing edge of the first fixed wing. The first fixed wing can be sized and shaped such that, in an operation of the cargo aircraft, the first fixed wing generates a region of accelerated airflow above the suction surface, an airspeed in the region of accelerated airflow being higher than an incoming airspeed forward of the leading edge, and the ram air turbine, in the extended position, is at least partially disposed in the region of accelerated airflow.

In some examples, the aircraft is configured to have a minimum takeoff speed and a minimum landing speed where, during a landing operation of the aircraft at the minimum landing speed or a takeoff operation of the aircraft at the minimum takeoff speed, the ram air turbine in the extended position is at least partially disposed in a region of accelerated airflow having a velocity at least about 50% greater than the respective minimum landing speed or the minimum takeoff speed. At least one of the minimum landing speed or the minimum takeoff speed can be less than about 100 knots. In some examples, the during either of the landing operation of the aircraft at the minimum speed or the takeoff operation of the aircraft at the minimum speed, the ram air turbine in the extended position is at least partially disposed in a region of accelerated airflow having a velocity at least about 25%, 50%, 75%, or 100% greater than the minimum landing speed. Examples includes disposing the ram air turbine in airflow regions up to 250% greater than the minimum landing speed, where the minimum landing speed can be 100 knots or lower.

Yet another embodiment of the present disclosure include a method of operating a fixed-wing aircraft, the method including deploying a ram air turbine from a suction surface of a lifting body connected to the fuselage while the lifting body is providing a lifting force on the fuselage, the lifting body including a suction surface and a pressure surface disposed on opposite sides of the lifting body from each other, the suction surface extending from a leading edge of the lifting body to a trailing edge of the lifting body, where the deploying moves the ram air turbine from a retracted position where the ram air turbine is stowed inside the aircraft to an extended position where the ram air turbine is disposed above the suction surface of the lifting body. The method can further include powering at least one of an electric system or a hydraulic system of the fixed-wing aircraft from use of the ram air turbine. In some examples, the ram air turbine in the extended position is located closer to a leading edge of the lifting body than to a trailing edge of the lifting body. In some examples, the ram air turbine in the retracted position is located forward of a fuel tank of the lifting body.

In some examples, the deploying the ram air turbine occurs during at least one of a takeoff operation or a landing operation. In some examples, the at least one of the takeoff operation or the landing operation includes the aircraft traveling at an airspeed of less than about 100 knots and the lifting body generating a region of accelerated airflow over the suction surface having a velocity of at least about 50% greater than the airspeed of the aircraft, and the ram air turbine being in the extended position is at least partially disposed in the region of accelerated airflow. In some examples, the ram air turbine is, in the extended position, at least partially disposed in a region of accelerated airflow having a velocity at least about 25%, 50%, 75%, or 100% greater than the minimum landing speed. Examples includes disposing the ram air turbine in airflow regions up to 250% greater than the minimum landing speed, where the minimum landing speed can be 100 knots or lower.

BRIEF DESCRIPTION OF DRAWINGS

This disclosure will be more fully understood from the following detailed description taken in conjunction with the accompanying drawings, in which:

FIG. 8 is an illustration of a ram air turbine;

FIG. 10A is a top view of the fixed upper wing of the cargo aircraft of FIG. 1A having a ram air turbine installed inboard of the engine and near the leading edge of the upper side of the fixed wing;

FIG. 10B is a cross section front view of the fixed wing of the aircraft of FIG. 10A showing the ram air turbine in a stowed configuration;

FIG. 10C is a cross section front view of the fixed wing of the aircraft of FIG. 10A showing the ram air turbine in a deployed configuration;

DETAILED DESCRIPTION

Figure 1A:
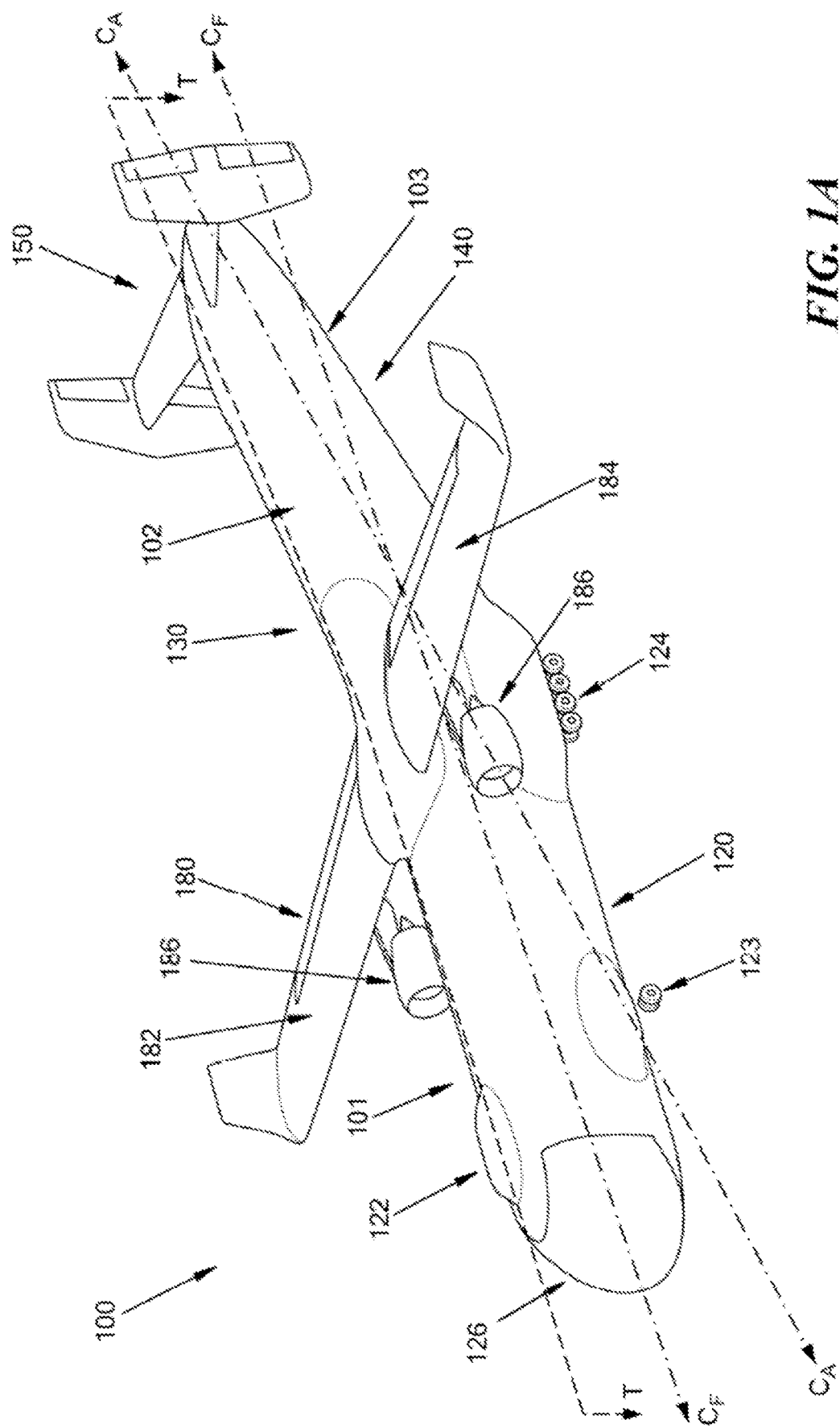
FIG. 1A is an isometric view of one exemplary embodiment of an aircraft.

Certain exemplary embodiments will now be described to provide an overall understanding of the principles of the structure, function, manufacture, and use of the devices, systems, aircraft, and methods disclosed herein. One or more examples of these embodiments are illustrated in the accompanying drawings. Those skilled in the art will understand that the devices, systems, aircraft, components related to or otherwise part of such devices, systems, and aircraft, and methods specifically described herein and illustrated in the accompanying drawings are non-limiting embodiments and that the scope of the present disclosure is defined solely by the claims. The features illustrated or described in connection with one embodiment may be combined with the features of other embodiments. Such modifications and variations are intended to be included within the scope of the present disclosure. Some of the embodiments provided for herein may be schematic drawings, including possibly some that are not labeled as such but will be understood by a person skilled in the art to be schematic in nature. They may not be to scale or may be somewhat crude renderings of the disclosed components. A person skilled in the art will understand how to implement these teachings and incorporate them into work systems, methods, aircraft, and components related to each of the same, provided for herein.

To the extent the present disclosure includes various terms for components and/or processes of the disclosed devices, systems, aircraft, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, while the present application describes loading an airplane through a front end of the aircraft, alternatively, or additionally, loading can occur through an aft end of the aircraft and/or from above and/or below the aircraft. In the present disclosure, like-numbered and like-lettered components of various embodiments generally have similar features when those components are of a similar nature and/or serve a similar purpose. To the extent terms such as front, back, top, bottom, forward, aft, proximal, distal, etc. are used to describe a location of various components of the various disclosures, such usage is by no means limiting, and is often used for convenience when describing various possible configurations. The foregoing notwithstanding, a person skilled in the art will recognize the common vernacular used with respect to aircraft, such as the terms "forward" and "aft," and will give terms of those nature their commonly understood meaning. Further in some instances, terms like forward and proximal or aft and distal may be used in a similar fashion.

The present disclosure is related to ram air turbine installations, for example on large, transport-category aircraft (e.g., fixed-wing, non-buoyant, and multi-engine jet aircraft), capable of moving oversized cargo not traditionally shippable by air. For example, wind turbine blades, which are typically highly elongated and irregular in shape in order to provide greater electrical power generating efficiency, or similarly long industrial equipment, shipping containers, or military equipment. The present disclosure is not limited to these specific cargos or payloads, but rather, these are examples. Example of the present disclosure include extremely long cargo aircraft (e.g., longer than 60 meters, or even longer than 84 meters) with very slow minimum takeoff and landing speeds (e.g., less than 100 knots and even less 60 knots), which may also include fuselage configuration with a kink about the lateral pitch axis to transport very long payloads or cargos. Further, aspects of the ram air turbine configurations disclosed herein are suitable for aircraft of any size, including non-fixed wing aircraft and with any propulsion means, including electric. The present teachings can be incorporated into existing aircrafts of all shapes and sizes as a retrofit and/or in newly made aircrafts of all shapes and sizes as a part of the manufactured design.

Fixed-wing aircraft traditionally meet their emergency aircraft control capabilities requirement by having a ram air turbine (RAT) that can be deployed from the main body of the fuselage and extend outward to experience airspeeds approximately equal to the airspeed of the aircraft. Accordingly, it is common to size and configure ram air turbines to provide emergency aircraft control capabilities at the minimum takeoff and landing speed in order to provide emergency aircraft control capabilities throughout the entire possible flight envelope. However, larger aircraft with larger control surfaces can require more energy, thereby necessitating a higher output from the RAT, but large aircraft with very slow minimum takeoff and landing speeds can require that increased energy to be generated from airspeeds that are not conducive to high power extraction. Accordingly, aspects of the present invention include RAT installations that deploy the RAT into the accelerated airflow above the suction side of a lifting surface, including the primary lifting surface (e.g., above the top of a main wing of the aircraft) where the velocity of air (and/or the velocity area of the air) during a minimum airspeed flight operation of the aircraft are maximized.

Aircraft

Figure 1B:
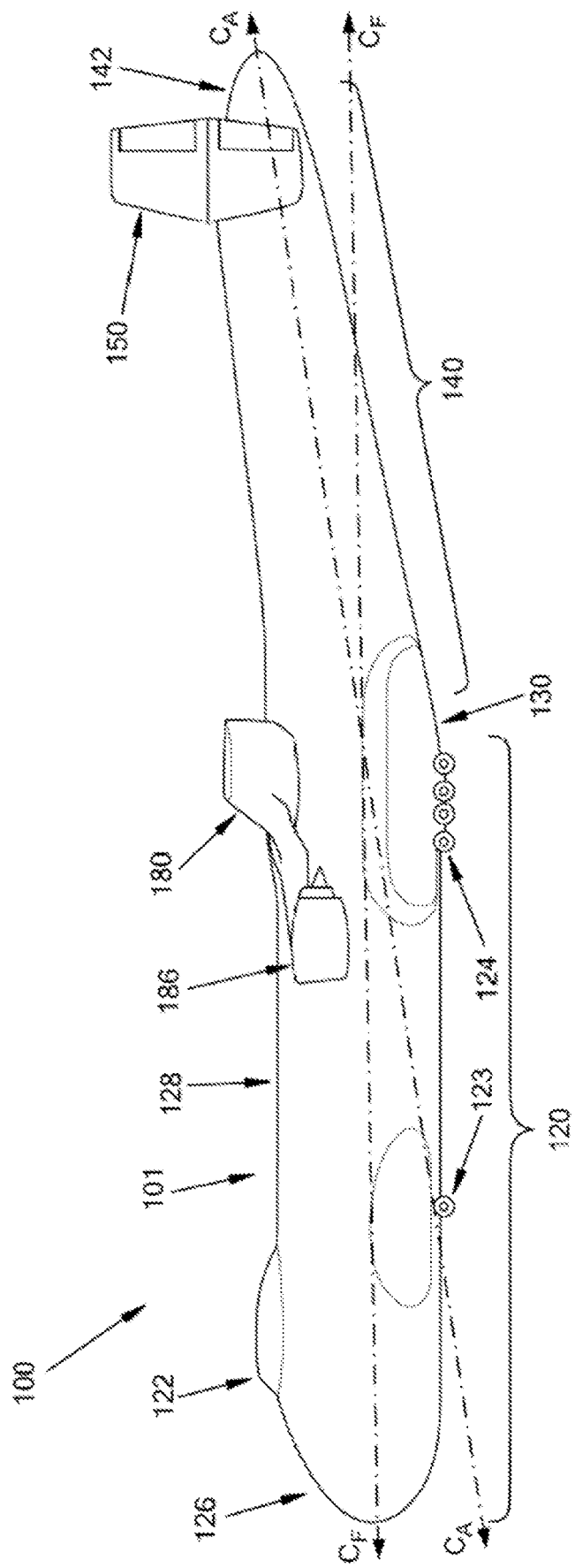
FIG. 1B is a side view of the aircraft of FIG. 1A.

The focus of the present disclosures is described with respect to a large aircraft 100, such as an airplane, illustrated in FIGS. 1A and 1B, along with the loading of a large payload into the aircraft, illustrated at least in FIGS. 2A-2D, and 6B-6D. Additional details about the aircraft and payload may be described with respect to the other figures of the present disclosure as well. In the illustrated embodiment, a payload 10 is a combination of two wind turbine blades 11A and 11B (FIGS. 2B-2D), although a person skilled in the art will appreciate that other payloads are possible. Such payloads can include other numbers of wind turbine blades (e.g., one, three, four, five, etc., or segments of a single even larger blade), other components of wind turbines (e.g., tower segments, generator, nacelle, gear box, hub, power cables, etc.), or many other large structures and objects whether related to wind turbines or not. The present application can be used in conjunction with most any large payload—large for the present purposes being at least about 57 meters long, or at least about 60 meters long, or at least about 65 meters long, or at least about 75 meters long, or at least about 85 meters long, or at least about 90 meters long, or at least about 100 meters long, or at least about 110 meters long, or at least about 120 meters long—or for smaller payloads if desired. Some non-limiting examples of large payloads that can be used in conjunction with the present disclosures beyond wind turbines include but are not limited to industrial oil equipment, mining equipment, rockets, military equipment and vehicles, commercial aerospace vehicles, crane segments, aircraft components, space launch rocket boosters, helicopters, generators, or hyperloop tubes. In other words, the aircraft 100 can be used with most any size and shape payload, but has particular utility when it comes to large, often heavy, payloads.

As shown, for example in FIGS. 1A-1B and 2A-2D, the aircraft 100, and thus its fuselage 101, includes a forward end 120 and an aft end 140, with a kinked portion 130 connecting the forward end 120 to the aft end 140. The forward end 120 is generally considered any portion of the aircraft 100, and related components, that are forward of the kinked portion 130 and the aft end 140 is considered any portion of the aircraft 100, and related components, that are aft of the kinked portion 130. The kinked portion 130, as described in greater detail below, is a section of the aircraft 130 in which both a top-most outer surface 102 and a bottom-most outer surface 103 of the fuselage 101 become angled (notably, the placement of reference numerals 102 and 103 in the figures do not illustrate location of the "kink" since they more generally refer to the top-most and bottom-most surfaces of the fuselage 101), as illustrated by an aft centerline CA of the aft end 140 of the fuselage 101 with respect to a forward centerline $C_F$ of the forward end 120 of the fuselage 101.

The forward end 120 can include a cockpit or flight deck 122, and landing gears, as shown a forward or nose landing gear 123 and a rear or main landing gear 124. The illustrated embodiment does not show various components used to couple the landing gears 123, 124 to the fuselage 101, or operate the landing gears (e.g., actuators, braces, shafts, pins, trunnions, pistons, cylinders, braking assemblies, etc.), but a person skilled in the art will appreciate how the landing gears 123, 124 are so connected and operable in conjunction with the aircraft 100. The forward-most end of the forward end 120 includes a nose cone 126. As illustrated more clearly in FIG. 2A, the nose cone 126 is functional as a door, optionally being referred to the nose cone door, thus allowing access to an interior cargo bay 170 defined by the fuselage 101 via a cargo opening 171 exposed by moving the nose cone door 126 into an open or loading position (the position illustrated in FIG. 2A; FIGS. 1A and 1B illustrate the nose cone door 126 in a closed or transport position). The door may operate by rotating vertically tip-upwards about a lateral axis, or by rotating horizontally tip-outboards about a vertical axis, or by other means as well such as translation forwards then in other directions, or by paired rotation and translation, or other means.

As described in greater detail below, the interior cargo bay 170 is continuous throughout the length of the aircraft 101, i.e., it spans a majority of the length of the fuselage. The continuous length of the interior cargo bay 170 includes the space defined by the fuselage 101 in the forward end 120, the aft end 140, and the kinked portion 130 disposed therebetween, such spaces being considered corresponding to the forward bay, aft bay, and kinked bay portions of the interior cargo bay 170. The interior cargo bay 170 can thus include the volume defined by nose cone 126 when it is closed, as well as the volume defined proximate to a fuselage tail cone 142 located at the aft end 140. In the illustrated embodiment of FIG. 2A, the nose cone door 126 is hinged at a top such that it swings clockwise towards the fuselage cockpit 122 and a fixed portion or main section 128 of the fuselage 101. In other embodiments, a nose cone door can swing in other manners, such as being hinged on a left or right side to swing clockwise or counter-clockwise towards the fixed portion 128 of the fuselage. The fixed portion 128 of the forwards fuselage 101 is the portion that is not the nose cone 126, and thus the forwards fuselage 101 is a combination of the fixed portion 128 and the nose cone 126. Alternatively, or additionally, the interior cargo bay 170 can be accessed through other means of access known to those skilled in the art, including but not limited to a hatch, door, and/or ramp located in the aft end 140 of the fuselage 101, hoisting cargo into the interior cargo bay 170 from below, and/or lowering cargo into the interior cargo bay 170 from above. One advantage provided by the illustrated configuration, at least as it relates to some aspects of loading large payloads, is that by not including an aft door, the interior cargo bay 170 can be continuous, making it significantly easier to stow cargo in the aft end 140 all the way into the fuselage tail cone 142. While loading through an aft door is possible with the present disclosures, doing so would make loading into and use of the interior cargo bay 170 space in the aft end 140 all the way into the fuselage tail cone 142 much more challenging and difficult to accomplish—a limitation faced in existing cargo aircraft configurations. Existing large cargo aircraft are typically unable to add cargo in this way (e.g., upwards and aftwards) because any kink present in their aft fuselage is specifically to create more vertical space for an aft door to allow large cargo into the forwards portion of the aircraft.

A floor 172 can be located in the interior cargo bay 170, and can also extend in a continuous manner, much like the bay 170 itself, from the forward end 120, through the kinked portion 130, and into the aft end 140. The floor 172 can thus be configured to have a forward end 172$f$, a kinked portion 172$k$, and an aft end 172$a$. In some embodiments, the floor 172 can be configured in a manner akin to most floors of cargo bays known in the art. In some other embodiments, discussed in greater detail below, one or more rails can be disposed in the interior cargo bay 170 and can be used to assist in loading a payload, such as the payload 10, into the interior cargo bay 170 and/or used to help secure the location of a payload once it is desirably positioned within the interior cargo bay 170. Additional fixtures and tooling designed to be used in conjunction with such rails are also discussed below at least with respect to FIGS. 8A-9.

Opening the nose cone 126 not only exposes the cargo opening 171 and the floor 172, but it also provides access from an outside environment to a cantilevered tongue 160 that extends from or otherwise defines a forward-most portion of the fixed portion 128 of the fuselage 101. The cantilevered tongue can be an extension of the floor 172, or it can be its own feature that extends from below or above the floor 172 and associated bottom portion of the fuselage 101. The cantilevered tongue 160 can be used to support a payload, thus allowing the payload to extend into the volume of the interior cargo bay 170 defined by the nose cone 126.

A wingspan 180 can extend substantially laterally in both directions from the fuselage. The wingspan 180 includes both a first fixed wing 182 and a second fixed wing 184, the wings 182, 184 extending substantially perpendicular to the fuselage 101 in respective first and second directions which are approximately symmetric about a longitudinal-vertical plane away from the fuselage 101, and more particularly extending substantially perpendicular to the centerline $C_F$. Wings 182, 184 being indicated as extending from the fuselage 101 do not necessarily extend directly away from the fuselage 101, i.e., they do not have to be in direct contact with the fuselage 101. Further, the opposite directions the wings 182, 184 extend from each other can alternatively be described as the second wing 184 extending approximately symmetrically away from the first wing 182. As shown, the wings 182, 184 define approximately no sweep angle and no dihedral angle. In alternative embodiments, a sweep angle can be included in the tip-forwards (−) or tip-aftwards (+) direction, the angle being approximately in the range of about −40 degrees to about +60 degrees. In other alternative embodiments, a dihedral angle can be included in the tip-downwards (negative, or "anhedral") or tip-upwards (positive, or "dihedral") direction, the angle being approximately in the range of about −5 degrees to about +5 degrees. Other typical components of wings, including but not limited to slats for increasing lift, flaps for increasing lift and drag, ailerons for changing roll, spoilers for changing lift, drag, and roll, and winglets for decreasing drag can be provided, some of which a person skilled in the art will recognize are illustrated in the illustrations of the aircraft 100 (other parts of wings, or the aircraft 100 more generally, not specifically mentioned in this detailed description are also illustrated and recognizable by those skilled in the art). Engines, engine nacelles, and engine pylons 186 can also be provided. In the illustrated embodiment, two engines 186, one mounted to each wing 182, 184 are provided. Additional engines can be provided, such as four or six, and other locations for engines are possible, such as being mounted to the fuselage 101 rather than the wings 182, 184.

The kinked portion 130 provides for an upward transition between the forward end 120 and the aft end 140. The kinked portion 130 includes a kink, i.e., a bend, in the fixed portion 128 of the fuselage 101 such that both the top-most outer surface 102 and the bottom-most outer surface 103 of the fuselage 101 become angled with respect to the centerline $C_F$ of the forward end 120 of the aircraft 100, i.e., both surfaces 102, 103 include the upward transition provided for by the kinked portion 130. As shown at least in FIG. 1B, the aft-most end of the aft end 140 can raise entirely above the centerline $C_F$. In the illustrated embodiment, the angle defined by the bottom-most outer surface 103 and the centerline $C_F$ is larger than an angle defined by the top-most outer surface 102 and the centerline $C_F$, although other configurations may be possible. Notably, although the present disclosure generally describes the portions associated with the aft end 140 as being "aft," in some instances they may be referred to as part of a "kinked portion" or the like because the entirety of the aft end 140 is angled as a result of the kinked portion 130. Thus, references herein, including in the claims, to a kinked portion, a kinked cargo bay or cargo bay portion, a kinked cargo centerline, etc. will be understood by a person skilled in the art, in view of the present disclosures, to be referring to the aft end 140 of the aircraft 100 (or the aft end in other aircraft embodiments) in some instances.

Despite the angled nature of the aft end 140, the aft end 140 is well-suited to receive cargo therein. In fact, the aircraft 100 is specifically designed in a manner that allows for the volume defined by the aft end 140, up to almost the very aft-most tip of the aft end 140, i.e., the fuselage tail cone 142, can be used to receive cargo as part of the continuous interior cargo bay 170. Proximate to the fuselage tail cone 142 can be an empennage 150, which can include horizontal stabilizers for providing longitudinal stability, elevators for controlling pitch, vertical stabilizers for providing lateral-directional stability, and rudders for controlling yaw, among other typical empennage components that may or may not be illustrated but would be recognized by a person skilled in the art.

The aircraft 100 is particularly well-suited for large payloads because of a variety of features, including its size. A length from the forward-most tip of the nose cone 126 to the aft-most tip of the fuselage tail cone 142 can be approximately in the range of about 60 meters to about 150 meters. Some non-limiting lengths of the aircraft 100 can include about 80 meters, about 84 meters, about 90 meters, about 95 meters, about 100 meters, about 105 meters, about 107 meters, about 110 meters, about 115 meters, or about 120 meters. Shorter and longer lengths are possible. A volume of the interior cargo bay 170, inclusive of the volume defined by the nose cone 126 and the volume defined in the fuselage tail cone 142, both of which can be used to stow cargo, can be approximately in the range of about 1200 cubic meters to about 12,000 cubic meters, the volume being dependent at least on the length of the aircraft 100 and an approximate diameter of the fuselage (which can change across the length). One non-limiting volume of the interior cargo bay 170 can be about 6850 cubic meters. Not accounting for the very terminal ends of the interior cargo bay 170 where diameters get smaller at the terminal ends of the fuselage 101, diameters across the length of the fuselage, as measured from an interior thereof (thus defining the volume of the cargo bay) can be approximately in the range of about 4.3 meters to about 13 meters, or about 8 meters to 11 meters. One non-limiting diameter of the fuselage 101 proximate to its midpoint can be about 9 meters. The wingspan, from tip of the wing 132 to the tip of the wing 134, can be approximately in the range of about 60 meters to 110 meters, or about 70 meters to about 100 meters. One non-limiting length of the wingspan 180 can be about 80 meters. A person skilled in the art will recognize these sizes and dimensions are based on a variety of factors, including but not limited to the size and mass of the cargo to be transported, the various sizes and shapes of the components of the aircraft 100, and the intended use of the aircraft, and thus they are by no means limiting. Nevertheless, the large sizes that the present disclosure both provides the benefit of being able to transport large payloads, but faces challenges due, at least in part, to its size that make creating such a large aircraft challenging. The engineering involved is not merely making a plane larger. As a result, many innovations tied to the aircraft 100 provided for herein, and in other commonly-owned patent applications, are the result of very specific design solutions arrived at by way of engineering.

Materials typically used for making fuselages can be suitable for use in the present aircraft 100. These materials include, but are not limited to, metals and metal alloys (e.g., aluminum alloys), composites (e.g., carbon fiber-epoxy composites), and laminates (e.g., fiber-metallic laminates), among other materials, including combinations thereof.

Figure 2A:
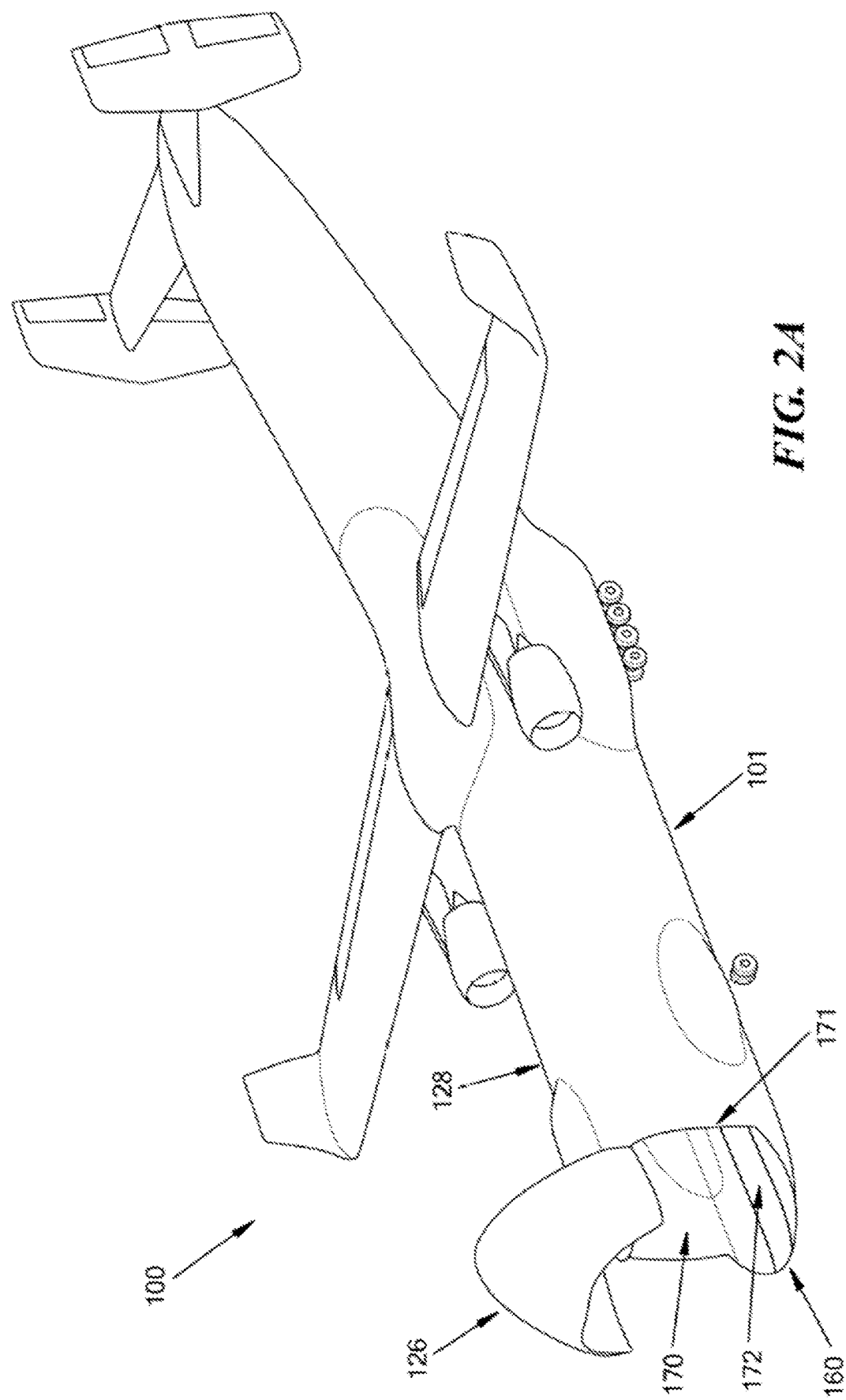
FIG. 2A is an isometric view of the aircraft of FIG. 1A with a nose cone door in an open position to provide access to an interior cargo bay of the aircraft.
Figure 2B:
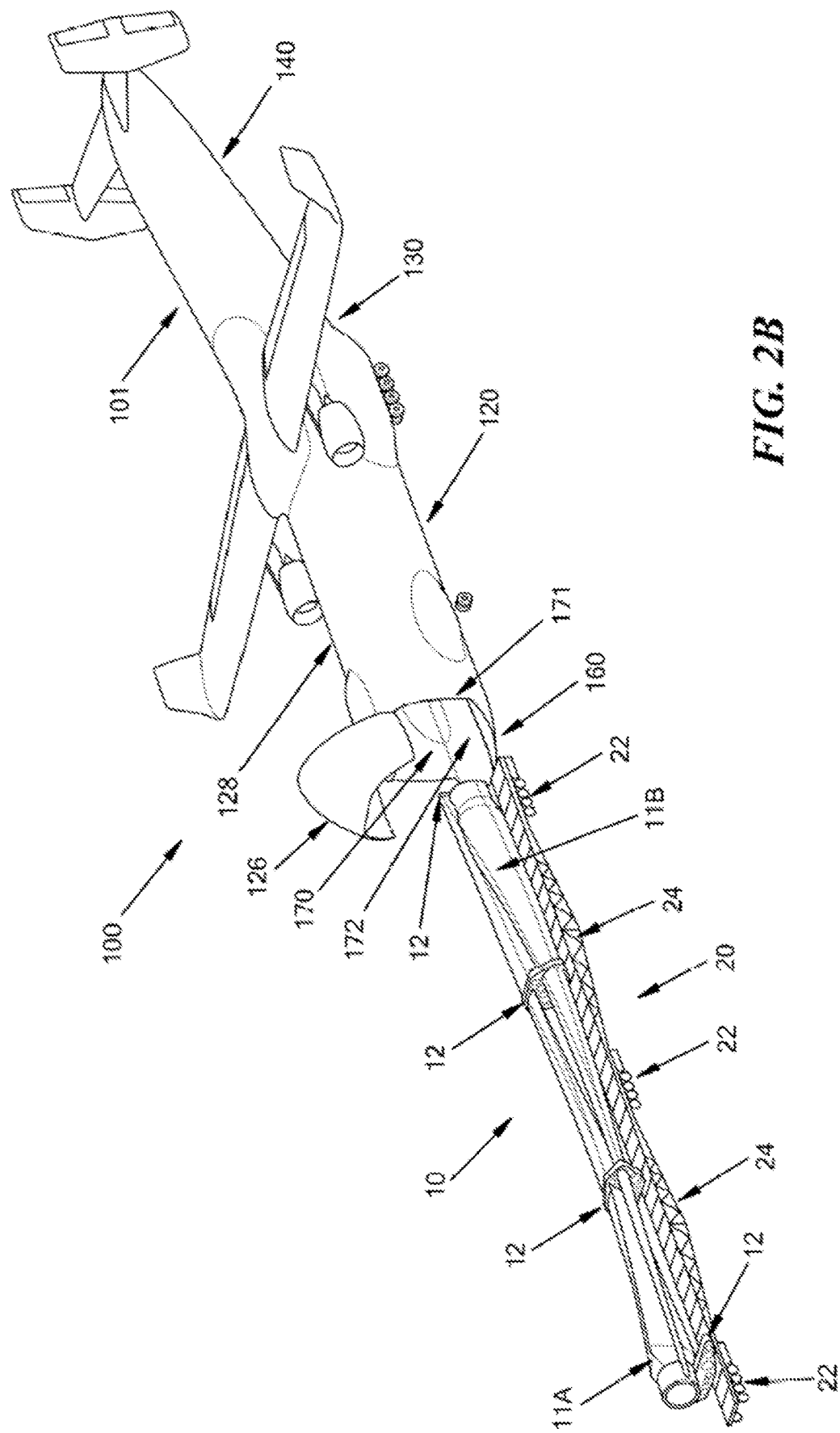
FIG. 2B is an isometric view of the aircraft of FIG. 2A with a payload being disposed proximate to the aircraft for loading into the interior cargo bay.
Figure 2C:
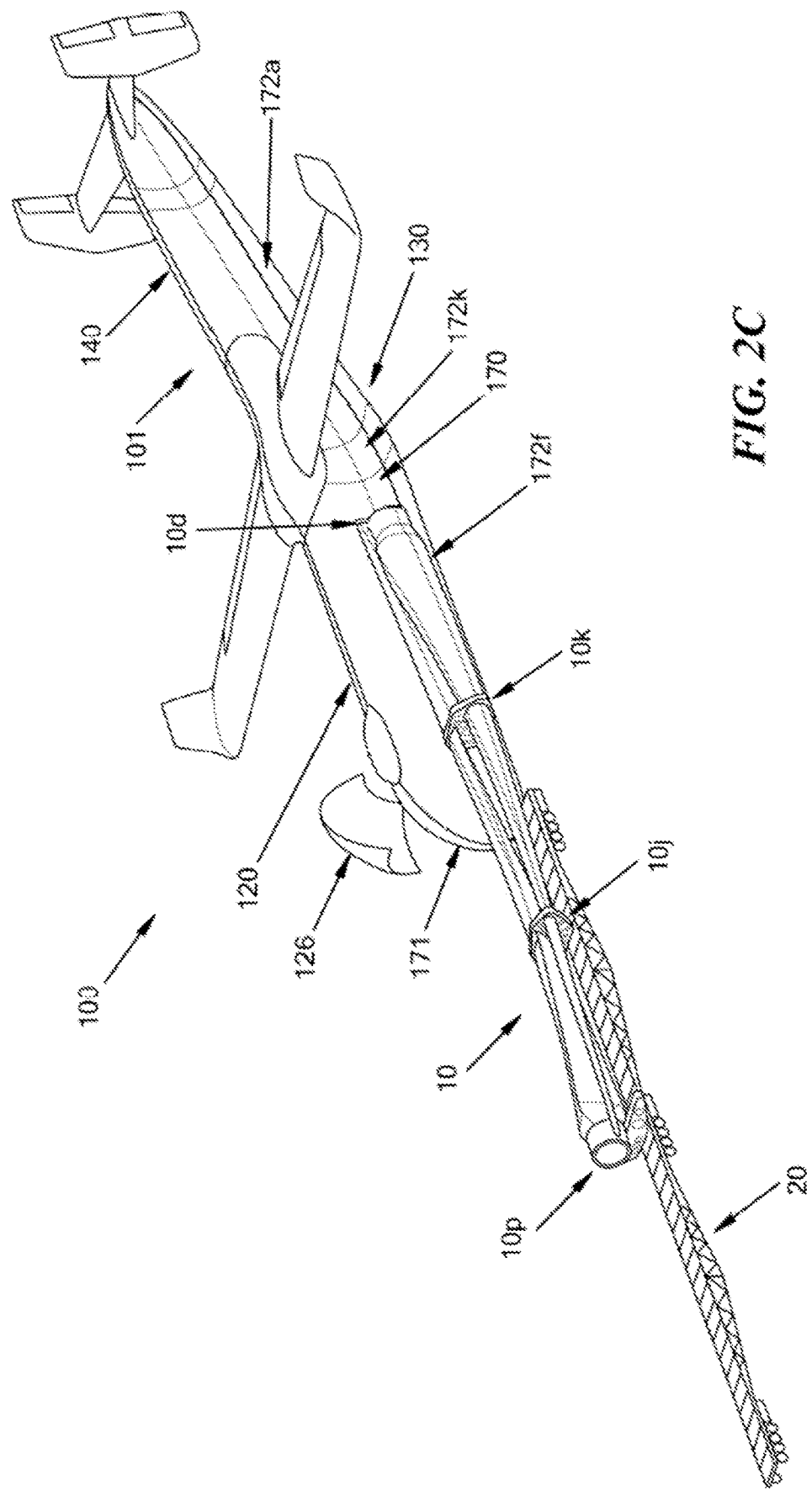
FIG. 2C is an isometric, partial cross-sectional view of the aircraft of FIG. 2B with the payload being partially loaded into the interior cargo bay.
Figure 2D:
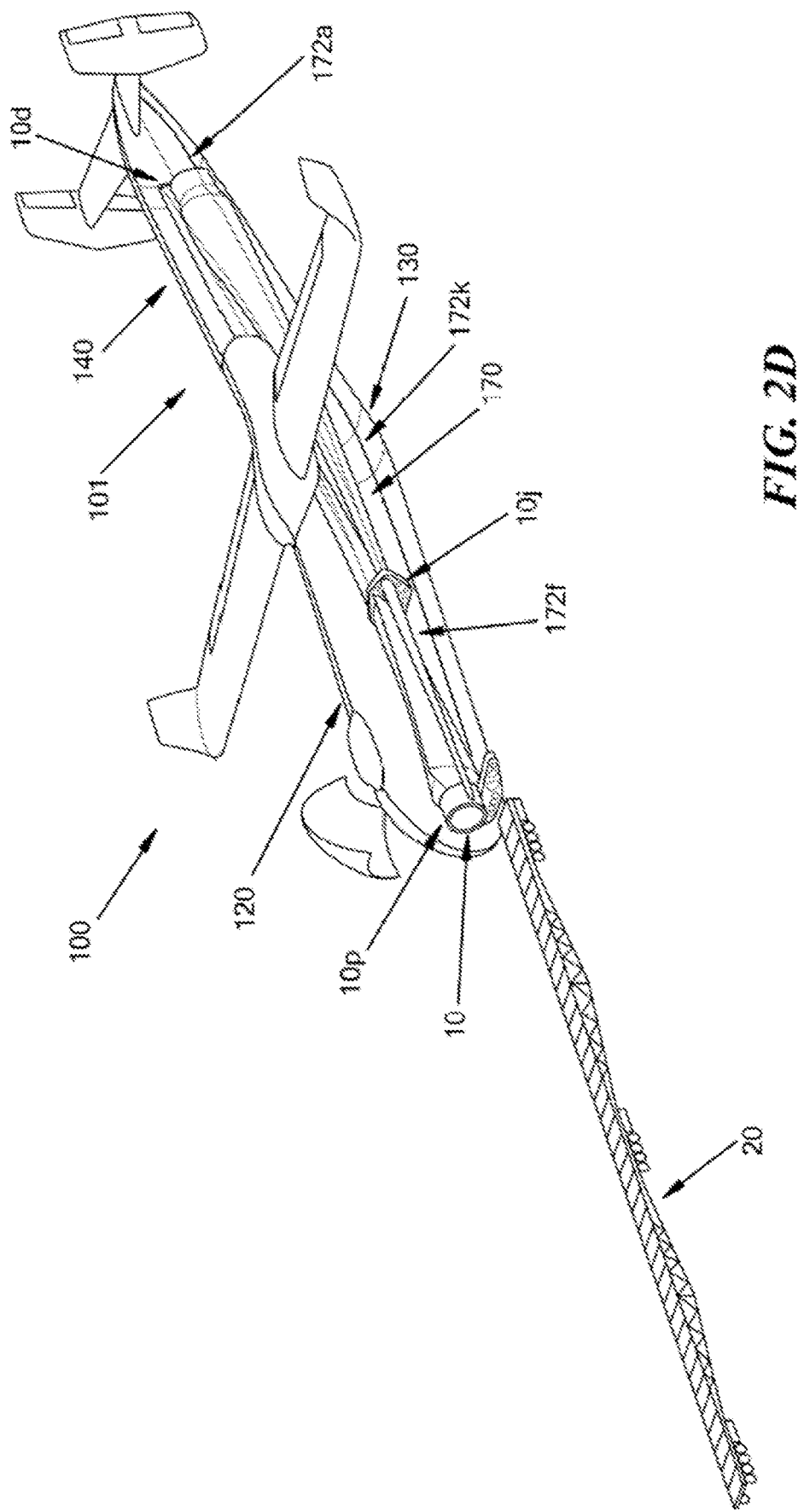
FIG. 2D is an isometric, partial cross-sectional view of the aircraft of FIG. 2C with the payload being fully loaded into the interior cargo bay.

FIGS. 2B-2D provide for a general, simplified illustration of one exemplary embodiment of loading a large payload 10 into the aircraft 100. As shown, the cargo nose door 126 is swung upwards into its open position, exposing the portion of the interior cargo bay 170 associated with the fixed portion 128 of the fuselage 101, which can extend through the kinked portion 130 and through essentially the entirety of the aft end 140. The cargo opening 171 provides access to the interior cargo bay 170, and the cantilevered tongue 160 can be used to help initially receive the payload. As shown, the payload 10 includes two wind turbine blades 11A, 11B, held with respect to each other by payload-receiving fixtures 12. The payload-receiving fixtures 12 are generally considered part of the payload, although in an alternative interpretation, the payload 10 can just be configured to be the blades 11A, 11B. This payload 10 can be considered irregular in that the shape, size, and weight distribution across the length of the payload is complex, causing a center of gravity of the payload to be at a separate location than a geometric centroid of the payload. One dimension (length) greatly exceeds the others (width and height), the shape varies with complex curvature nearly everywhere, and the relative fragility of the payload requires a minimum clearance be maintained at all times as well as fixturing support the length of the cargo at several locations even under the payload's own weight under gravity. Additional irregular payload criteria can include objects with profiles normal to a lengthwise axis rotate at different stations along that axis, resulting in a lengthwise twist (e.g., wind turbine blade spanwise twist) or profiles are located along a curved (rather than linear) path (e.g., wind turbine blade in-plane sweep). Additionally, irregular payloads include objects where a width, depth, or height vary non-monotonically along the length of the payload (e.g., wind turbine blade thickness can be maximal at the max chord station, potentially tapering to a smaller cylinder at the hub and to a thin tip). The term irregular package will be similarly understood.

The payload 10, which can also be referred to as a package, particularly when multiple objects (e.g., more than one blade, a blade(s) and ballast(s)) are involved, possibly secured together and manipulated as a single unit, can be delivered to the aircraft 100 using most any suitable devices, systems, vehicles, or methods for transporting a large payload on the ground. A package can involve a single object though. In the illustrated embodiment, a transport vehicle 20 includes a plurality of wheeled mobile transporters 22 linked together by a plurality of spans, as shown trusses 24. In some instances, one or more of the wheeled mobile transporters 22 can be self-propelled, or the transport vehicle 20 more generally can be powered by itself in some fashion. Alternatively, or additionally, an outside mechanism can be used to move the vehicle 20, such as a large vehicle to push or pull the vehicle 20, or various mechanical systems that can be used to move large payloads, such as various combinations of winches, pulleys, cables, cranes, and/or power drive units.

As shown in FIG. 2B, the transport vehicle 20 can be driven or otherwise moved to the forward end 120 of the aircraft 100, proximate to the cargo opening 171. Subsequently, the payload 10 can begin to be moved from the transport vehicle 20 and into the interior cargo bay 170. This can likewise be done using various combinations of one or more winches, pulleys, cables, cranes, and/or power drive units, such set-ups and configurations being known to those skilled in the art. FIG. 2C illustrates a snapshot of the loading process with half of the fuselage removed for illustrative purposes (as currently shown, the half of the nose cone 126 illustrated is in both an open and closed position, but during loading through the cargo opening 171, it is in an open position). As shown, the payload 10 is partially disposed in the interior cargo bay 170 and is partially still supported by the transport vehicle 20. A distal end 10d of the payload 10 is still disposed in the forward end 120, as it has not yet reached the kinked portion 130.

The system and/or methods used to move the payload 10 into the partially loaded position illustrated in FIG. 2C can continue to be employed to move the payload 10 into the fully loaded position illustrated in FIG. 2D. As shown, the distal end 10d of the payload 10d is disposed in the interior cargo bay 170 at the aft end 140, a proximal end 10p of the payload 10 is disposed in the interior cargo bay 170 at the forward end 120 (for example, on the cantilevered tongue 160, although the tongue is not easily visible in FIG. 2D), and the intermediate portion of the payload 10 disposed between the proximal and distal ends 10p, 10d extends from the forward end 120, through the kinked portion 130, and into the aft end 140. As shown, the only contact points with a floor of the interior cargo bay 170 (which for these purposes includes the tongue 160) are at the proximal and distal ends 10p, 10d of the payload 10 and at two intermediate points 10j, 10k between the proximal and distal ends 10p, 10d, each of which is supported by a corresponding fixture 12. In other embodiments, there may be fewer or more contact points, depending, at least in part, on the size and shape of each of the payload and related packaging, the size and shape of the cargo bay, the number of payload-receiving fixture used, and other factors. This illustrated configuration of the payload disposed in the interior cargo bay 170 is more clearly understood by discussing the configuration of the kinked fuselage (i.e., the fuselage 101 including the kinked portion 130) in greater detail. Once the payload 10 is fully disposed in the interior cargo bay 170, it can be secured within the cargo bay 170 using techniques provided for herein, in commonly-owned applications, or otherwise known to those skilled in the art.

Kinked Fuselage

Figure 3:
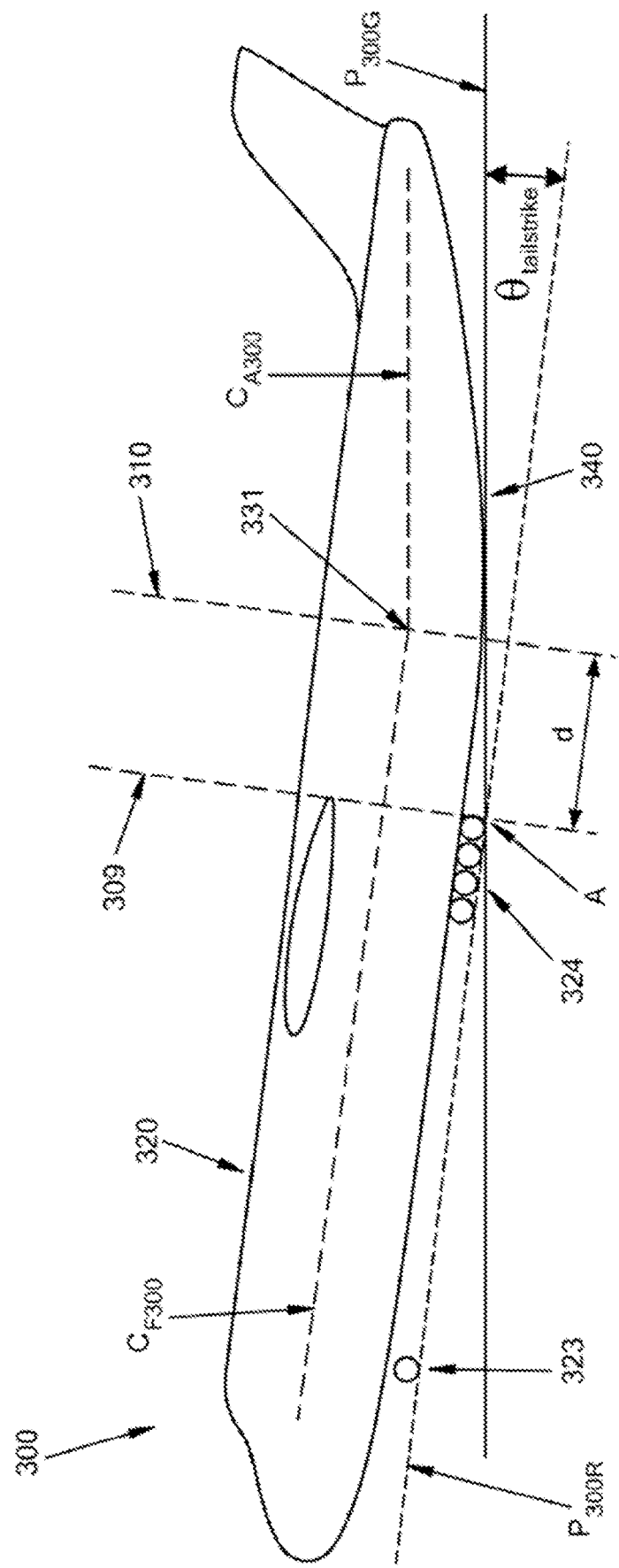
FIG. 3 is a schematic side view of an aircraft in the prior art, illustrating a lateral axis of rotation with respect to tail strike.

FIG. 3 is an illustration of a prior art aircraft 300 during a takeoff pitch-up maneuver showing the calculating of a tailstrike angle ($\theta_{tailstrike}$), which is determined when a forward end 320 of the aircraft 300 is lifted away from the ground $P_{300G}$ (e.g., a runway of an airport) and an aft end 340 and tail of the aircraft 300 is pushed towards the ground 50 until contact. This change occurs during a takeoff pitch-up maneuver when the aircraft 300 pitches (e.g., rotates) about a lateral axis of rotation, indicated as "A" in FIG. 3. This lateral axis of rotation, A, is typically defined by the main landing gear 324, which acts as a pivot point to allow a downwards force generated by the tail to lift the forward end 320 of the aircraft 300. In FIG. 3, the nose landing gear 323 and main landing gear 324 of the aircraft 300 define a resting plane $P_{300R}$ (e.g., plane horizontal with the ground plane $P_{300G}$ when the aircraft is resting), such that the tailstrike angle $\theta_{tailstrike}$ can be defined by the change in the angle of the ground plane $P_{300G}$ with respect to the resting plane $P_{300R}$ when the aircraft 300 has achieved a maximal pitch angle or takeoff angle, which occurs just before any part of the aft end 340 of the aircraft 300 strikes the ground. In FIG. 3, a forward center line $C_{F300}$ of the aircraft 300 is shown, along with an aft centerline $C_{A300}$, which extends to the aft end 340 of the aircraft 300. In order to increase $\theta_{tailstrike}$, larger aircraft 300 usually have an upsweep to the lower surface of an aft region of the aft fuselage. This upsweep deflects the centerline $C_{A300}$ with respect to the forward center line $C_{F300}$ at the initiation of the upsweep, which is shown in FIG. 3 as a bend 331 in the centerlines $C_{F300}$, $C_{A300}$. In prior art aircraft 300, this bend 331 occurs a certain distance, shown in FIG. 3 as distance "d" aft of the lateral axis of rotation A. Longer values of distance "d" increase the constant cross-section length of the aircraft 300, which can, depending on the type of aircraft, extend the length of a passenger cabin and/or increase the length of the cargo bay, and thus the ability to carry cargo of an increased maximum length. Aspects of the present disclosure eschew this prior art incentive for increasing distance "d" and instead significantly reconfigure the relationship between the aft fuselage and forward fuselage such that decreasing distance "d" can result in increasing the maximum usable cargo bay length, as explained in more detail below.

Figure 4A:
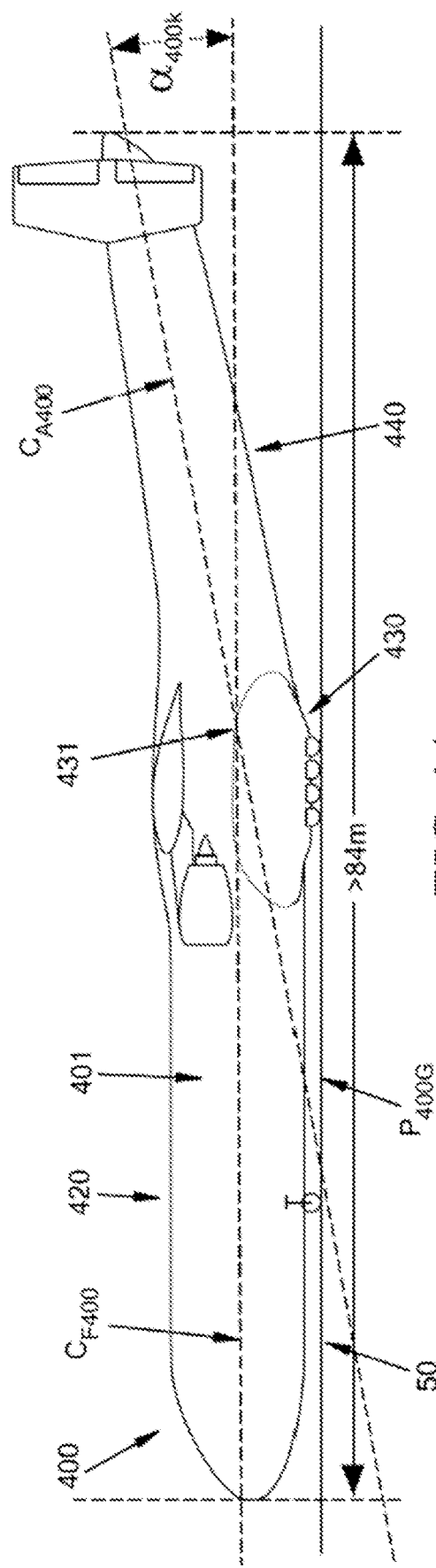
FIG. 4A is a side view of an alternative exemplary embodiment of an aircraft.
Figure 4B:
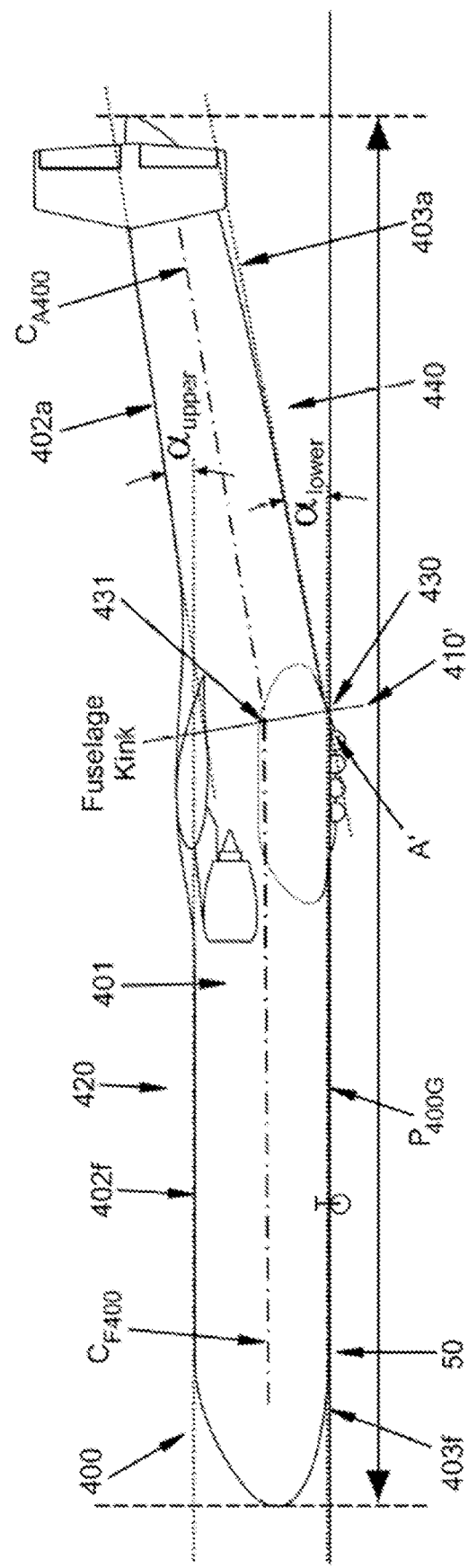
FIG. 4B is a side transparent view of the aircraft of FIG. 4A.

FIG. 4A is a side view illustration of an exemplary cargo aircraft 400 of the present disclosure. The aircraft 400, which is shown to be over 84 meters long, includes a fuselage 401 having a forward end 420 defining a forward centerline $C_{F400}$ and an aft end 440 defining an aft centerline $C_{A400}$, with the aft centerline $C_{A400}$ being angled up with respect to the forward centerline $C_{F400}$. The forward and aft centerlines $C_{F400}$, $C_{A400}$ define a junction or kink 431 therebetween, where the forward centerline $C_{F400}$ angles upward as the overall aft fuselage, which is in the aft end 440, changes in direction to be angled with respect to the forward fuselage, which is in the forward end 420. This defines a kink angle $\alpha_{400k}$ of the aft fuselage 440. The kink location 431 is contained in the kinked portion 430 disposed between and connecting the forward and aft ends 420, 440. FIG. 4B shows the forward centerline $C_{F400}$ as being an approximate midpoint between a top-most outer or upper surface 402f and a bottom-most outer or lower surface 403f of the fuselage 401 forward of a lateral axis of rotation A', with the aft centerline $C_{A400}$ being an approximate midpoint between an upper surface 402a and a lower surface 403a of the fuselage 401 aft of the lateral axis of rotation. FIG. 4B shows the kink 431 between the forward centerline $C_{F400}$ and the aft centerline $C_{A400}$ as being an approximate change in the angle of a plane 410' substantially perpendicular to the centerline $C_{F400}$ and most of the upper and lower surfaces 402a, 403a extending aft from the kink 431, such that the fuselage 401 aft of the kink 431 has a substantial portion of an approximately constant height or cross-sectional area. This represents only one example, and in other instances the upper surface 402a does not necessarily extend approximately parallel to the lower surface 402b at all even if the aft fuselage still defines a kink 431 in the centerline.

In FIG. 4B, the angle of the aft centerline $C_{A400}$ with respect to the forward centerline $C_{F400}$ defines a kink or bend angle (illustrated as $\alpha_{400K}$ in FIG. 4A), which can be approximately equal to average of an angle $\alpha_{upper}$ of the after upper surface e 402a and an angle mower of the lower surface 403a with respect to the forward centerline $C_{F400}$ and forward upper and lower surfaces 402f, 403f for the case of a constant cross-section forward fuselage 401, as shown in FIG. 4B (hence, FIG. 4B indicating the upper and lower surfaces 402a, 403a defining the respective upper and lower angles $\alpha_{upper}$, Glower). In some instances, the angles $\alpha_{upper}$, mower of the aft upper and lower surfaces 402a, 403a vary with respect to the angle of the aft centerline $C_{A400}$, with the location of a substantial upward deflection in the overall centerline (e.g., kink 431) being defined by the overall shape and slope of the aft fuselage with respect to the forward fuselage (or more generally the overall shape and slope of the aft end 440 with respect to the forward end 420). For example, for the aircraft 100 of FIG. 1B, the lower surface defines a lower angle $\alpha_{lower}$, which is approximately equal to the tailstrike angle of approximately 12 degrees, and the upper surface angle $\alpha_{upper}$ in the aft fuselage is approximately between 6 and 7 degrees. In some exemplary embodiments, the result kink angle of the aft centerline $C_{A400}$ can be approximately in the range of about 0.5 degrees to about 25 degrees, and in some instance it is about 10 degrees with respect to a longitudinal-lateral plane of the cargo aircraft 100, i.e., a plane in which the forward centerline $C_{F400}$ is disposed, the plane extend substantially parallel to the ground or a ground plane $P_{400G}$. Further, the kink angle $\alpha_{400K}$ can be approximately equal to a degree of maximal rotation of the aircraft during the takeoff operation. Still further, a length of the aft end 140, i.e., the portion that is angled with respect to the forward centerline $C_{F400}$, can be approximately in the range of about 15% to 65%, and in some instances about 35% to about 50% of a length of the entire fuselage 101, and in some embodiments it can be about 49% the length of the fuselage 101.

Figure 4C:
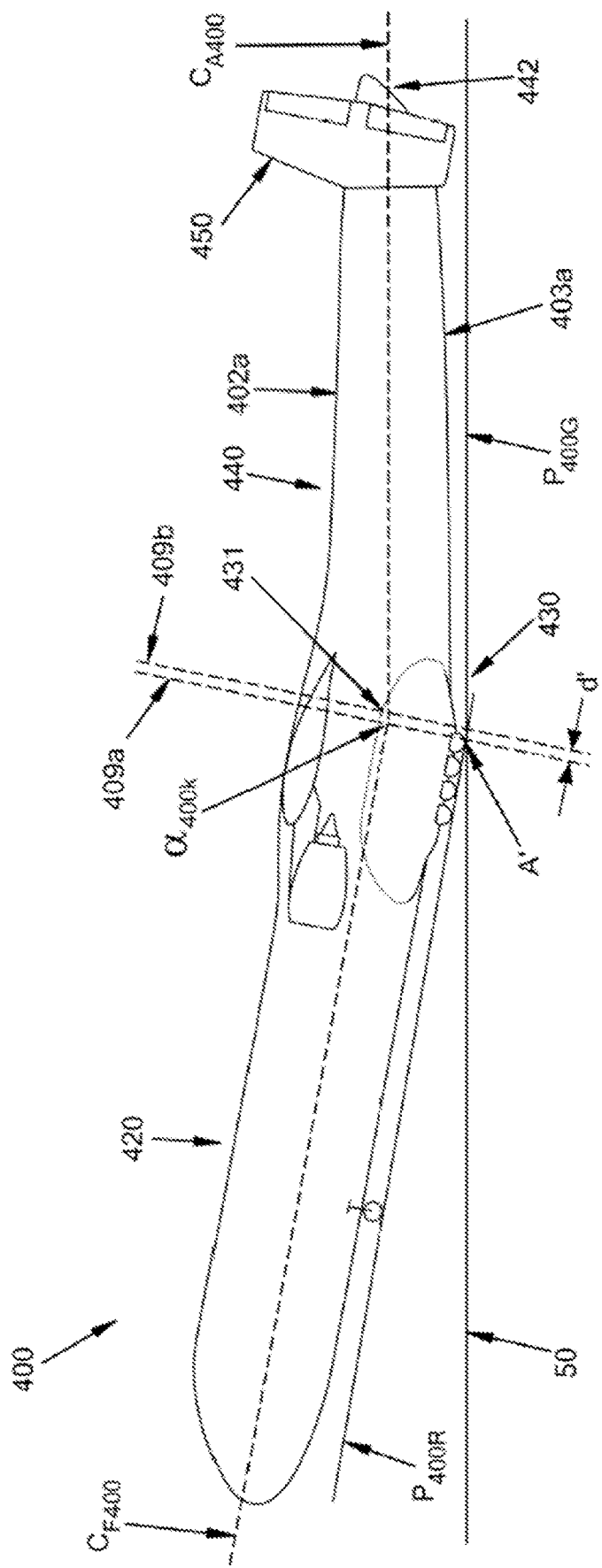
FIG. 4C is a side view of the aircraft of FIG. 4B in a take-off position.
Figure 5A:
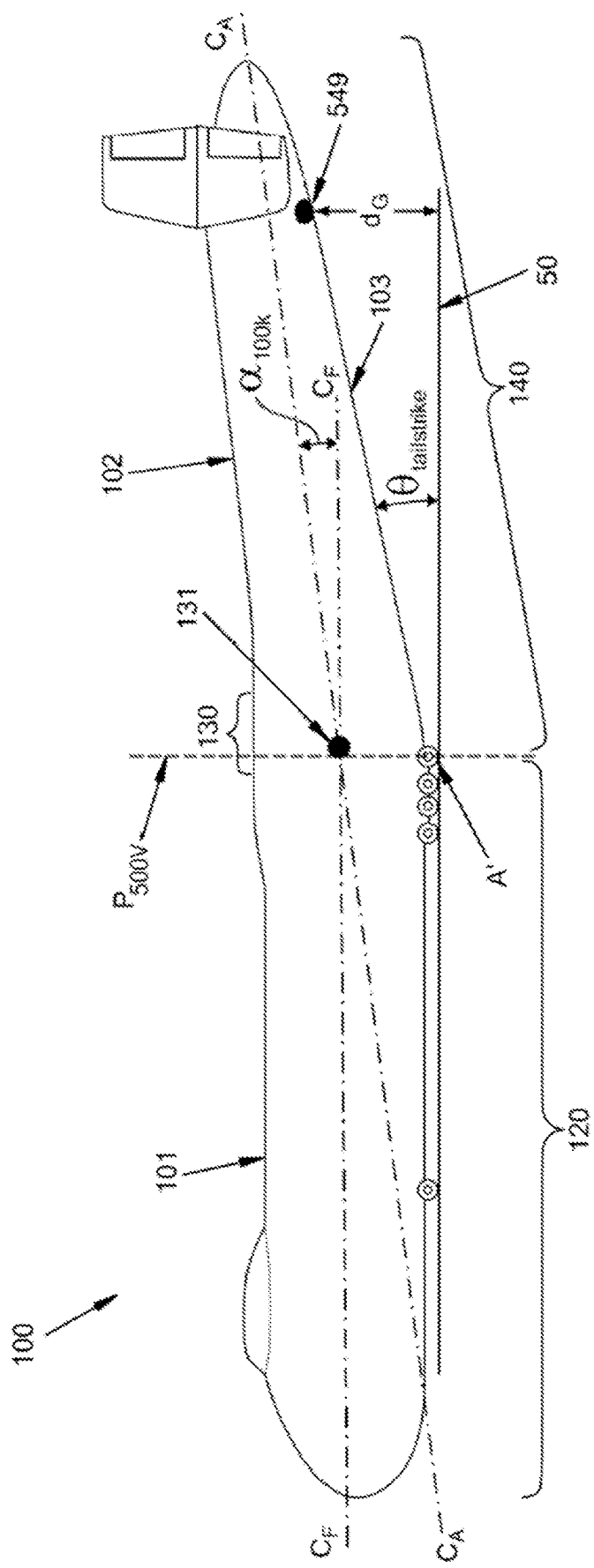
FIG. 5A is the side view of the aircraft of FIG. 1A with some additional details removed for clarity.

In FIG. 4C, the cargo aircraft 400 is shown on the ground 50 and rotated about the lateral axis of rotation to illustrate, for example, a takeoff pitch-up maneuver. In FIG. 4C, a resting plane $P_{400R}$ of the forward end 420 angled with respect to the ground or ground plane $P_{400G}$ at a degree just before $\theta_{tailstrike}$, as no part of the aft end 440, empennage 450, or tail 442 is contacting the ground. In this position, the lower surface 403a (and, approximately, the aft centerline $C_{A400}$) is substantially parallel with the ground or ground plane $P_{400G}$, and it can be seen that because the location of the centerline kink 431 of the kinked portion 430 is approximately with, or very close to, the lateral axis of rotation A', the angle $\alpha_{400K}$ of the kink 431 is approximately the maximum safe angle of rotation of the aircraft 400 about the lateral axis of rotation A'. FIG. 4C shows a vertical axis 409a aligned with the location of the lateral axis of rotation A' and another vertical axis 409b aligned with the kink 431 in the fuselage centerline $C_{F400}$, with a distance d' therebetween. With d' being small, and the lower surface 403a of the aft end 440 extending aft with approximately the kink angle $\alpha_{400K}$ of the kink 431 or a slightly larger angle, as shown, the aft end 440 is highly elongated without risking a tail strike. Accordingly, minimizing d' approximately sets the lower angle $\alpha_{lower}$ as an upper limit to the safe angle of rotation about the lateral pitch axis. Moreover, the upward sweep of the upper surface 402a can be arranged to maintain a relatively large cross-sectional area along most of the aft end 440, thereby enabling a substantial increase in the overall length of the cargo aircraft 400, and thus usable interior cargo bay within the aft end 440, without increasing $\theta_{tailstrike}$. FIG. 5A shows this in further detail for the cargo aircraft 100 of FIG. 1A.

In FIG. 5A, the aft centerline CA and forward centerline $C_F$ of the fuselage 101 are shown intersecting at a kink location 131 just aft of the vertical plane $P_{500V}$ of the lateral axis of rotation A', which occurs within the kinked portion 130 connecting the forward end or fuselage 120 to the aft end or fuselage 140. The lower surface 103 of the aft fuselage 140 approximately defines $\theta_{tailstrike}$ of the cargo aircraft 100, which is slightly larger than a kink angle $\alpha_{100K}$ defined by the upslope of the aft centerline CA with respect to the forward centerline $C_F$. Additionally, in some examples, the aft fuselage can include a sensor 549 configured to measure the distance $d_G$ of the lower surface 103 of the aft fuselage 140 to the ground 50 to assist the pilot and/or computer in control of the aircraft 100 in maximally rotating the aircraft 100 about the lateral pitch axis without tailstrike.

As explained in more detail below, vertically aligning the kink location 131 with the lateral pitch axis can enable the aft fuselage 140 to extend without decreasing $\theta_{tailstrike}$, which also can enable the useable portion of the interior cargo bay 170 to extend aft along a substantial portion of the aft fuselage 140. Further, the present designs can enable the creation of extremely long aircraft designs capable of executing takeoff and landing operations with shorter runway lengths than previously possible. These lengths can be the equivalent of existing typical runway lengths, or even shorter, which is surprising for an airplane that is longer. Runway lengths approximately in the range of about 500 meters to about 1000 meters are likely possibly in view of the present disclosures, as compared to existing runways, which are about 2000 meters for standard aircraft and about 3000 meters for larger aircrafts. Thus, the engineering related to the aircraft 100, 400, and other embodiments of aircraft derivable from the present disclosures, enable extremely large aircraft that can be used on runways that are the smaller than runways for aircraft that are considered to be large aircraft due, at least in part, to the designs enabling increased pitch angles without causing tailstrike.

A further advantage provided by the present designs is being able to maintain the location of the center-of-gravity of the aircraft close to the lateral pitch axis, which minimizes the downforce required by the tail to rotate the aircraft during takeoff. This minimization of necessary downforce allows pitch-up maneuvers to occur at slower speeds, thereby increasing the available angle of attack (and thus lift) able to be generated at a given speed, which in turn reduces the speed necessary to generate enough lift to get the aircraft off the ground. This advantage is not achievable in prior art designs that attempt to increase their cargo length efficiency (e.g., maximum linear payload length as a function of overall fuselage length) at least because: (1) a reduction in tailstrike angle as the aft fuselage is elongated aft of the lateral rotation axis (e.g., in designs with an aft fuselage bend location being a substantial distance from their lateral axis of rotation); (2) a reduced ability to complete a pitch-up maneuver at low-speeds if the lateral pitch axis is moved aft of the center-of-gravity of the aircraft to accommodate the elongated fuselage, necessitating a substantial increase in wing and/or tail size to achieve the takeoff lengths equal to aircraft designs having lateral pitch axis closer to their center-of-gravity; and/or (3) a reduction in the cargo bay diameter as the aft end of the cargo bay is extended further toward the tail.

Figure 5B:
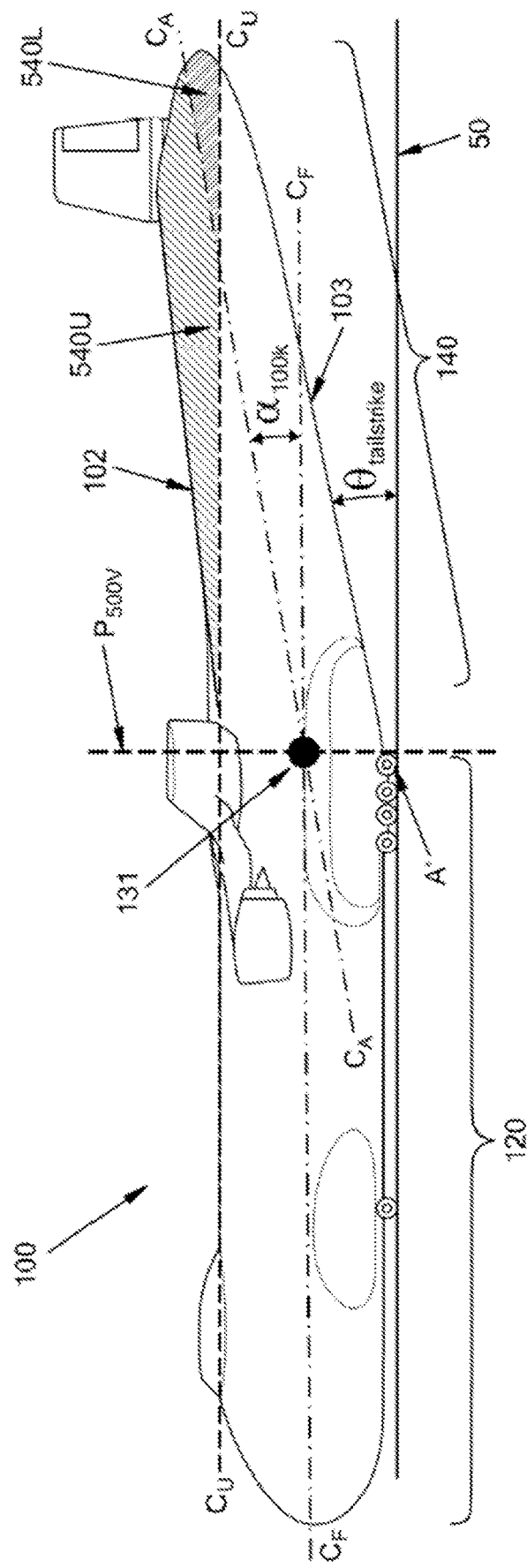
FIG. 5B is the side view of the aircraft of FIG. 1A showing the vertical extension of the aft fuselage above the forward portion of the fuselage.

FIG. 5B shows the vertical extension of the aft fuselage 140 above the forward portion 120 of the fuselage 101. In FIG. 5B, a line $C_u$ is drawn showing the approximately horizontal extension of the upper surface of the forward portion 120 of the fuselage 101. A substantial portion of the aft portion 140 of the fuselage extends above this line $C_u$. This includes an upper portion 540U of the aft portion 140 that is above both the line $C_u$ and the aft centerline CA and a lower portion 540L that is above the both the line $C_u$ and below the aft centerline CA. The size of the upper and lower portions 540U, 540L depends on the kink angle $\alpha_{100K}$, the length of the aft portion 140, and one or both of the upper and lower angles $\alpha_{upper}$, $\alpha_{lower}$, as these together define the kink angle $\alpha_{100K}$ and the height of the of the aft portion 140 as it extends to the aft end. In some examples, a substantial portion of both the upper and lower portions 540U, 540L is occupied by a portion of the interior cargo bay 170.

Figure 6A:
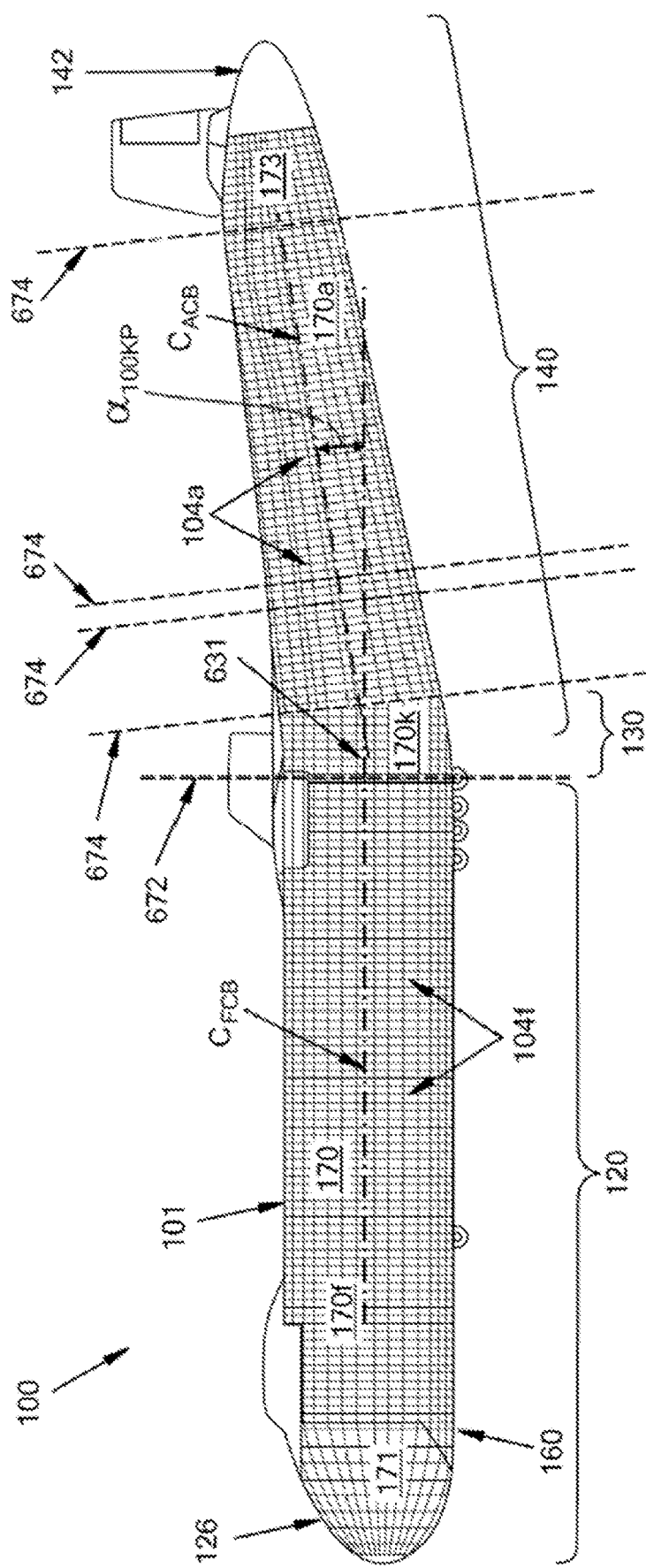
FIG. 6A is a side cross-sectional view of the aircraft of FIG. 5A, including an interior cargo bay of the aircraft.

FIG. 6A is side cross-section view of the cargo aircraft 100, the cross-section being taken along an approximate midline T-T of the top-most outer surface, as shown in FIG. 1A. The cargo bay 170 defines a centerline that extends along the overall length of the cargo bay 170. The cargo bay 170 extends from a forward end 171 of a forward end or region 170f of the cargo bay 170, as shown located in the nose cone 126, to an aft end 173 of an aft end or region 170a of the cargo bay 170, as shown located in the fuselage tail cone 142. The forward and aft regions 170f, 170a of the cargo bay 170 sit within the forward and aft ends 120, 140, respectively, of the aircraft 100. More particularly, the forward region 170f can generally define a forward cargo centerline $C_{FCB}$ that can be substantially colinear or parallel to the forward fuselage centerline $C_F$ (shown in FIG. 5A) and the aft region 170a can generally define an aft cargo centerline $C_{ACB}$ that can be substantially colinear or parallel to the aft fuselage centerline CA (shown in FIG. 5A). Accordingly, in the kinked portion 130 of the fuselage 101, which itself can include a comparable kinked portion 170k of the cargo bay 170, where the aft fuselage centerline CA bends with respect to the forward fuselage centerline $C_F$, the aft cargo centerline $C_{ACB}$ also bends at a kink location 631 with respect to the forward cargo centerline $C_{FCB}$. The bend can be at approximately the same angle, as shown an angle $\alpha_{100KP}$, as the kink angle $\alpha_{100K}$ of the fuselage 101. The aft cargo centerline $C_{ACB}$ can extend at least approximately 25% of a length of a centerline of the continuous interior cargo bay 170, i.e., the length of the centerline throughout the entire cargo bay 170. This amount more generally can be approximately in the range of about 25% to about 50%. There are other ways to describe these dimensional relationships as well, including, by way of non-limiting example, a length of the aft cargo centerline $C_{ACB}$ being at least approximately 45% of the length of the fuselage 101 and/or at least approximately 80% of a length of the fuselage 101 aft of the lateral pitch axis, among other relationships provided for herein or otherwise derivable from the present disclosures.

FIG. 6A shows the aft region 170a of the cargo bay 170 extending through almost all of the aft fuselage 140, which is a distinct advantage of the configurations discussed herein. Moreover, due to the length of the aft fuselage 140, a pitch 674 of structural frames 104a of the aft fuselage 140 can be angled with respect to a pitch 672 of structural frames 104f of the forward fuselage 120 approximately equal to the kink angle $\alpha_{100K}$ of the fuselage 101. In some examples, the kinked region 130 represents an upward transition between the pitch 672 of the structural frames 104f of the forward fuselage 120 and the pitch 674 of the structural frames 104a of the aft fuselage 140. A person skilled in the art will recognize that structural frames 104a, 104f are merely one example of structural features or elements that can be incorporated into the fuselage 101 to provide support. Such elements can be more generally described as circumferentially-disposed structural elements that are oriented orthogonally along the aft centerline $C_{ACB}$ and the forward centerline $C_{FCB}$. In some examples, the location of the cargo bay kink 631 (FIG. 6A) is forward or aft of the fuselage kink 131 (FIG. 5A) such that either the forward cargo region 170f partially extends into the aft fuselage 140 or the aft cargo region 170a partially extends into the forward fuselage 120, however, this generally depends, at least in part, on the distance between the interior of the cargo bay 170 and the exterior of the fuselage, which is typically a small distance for cargo aircraft having a maximally sized cargo bay. Regardless, to fully utilize examples of the present disclosure, the aft region 170a of the cargo bay 170 can be both (1) able to be substantially extended due to the ability of the aft fuselage 140 length to be extended and (2) able to extend along substantially all of the length of the aft fuselage 140 because examples of the present disclosure enable aircraft to have elongated aft fuselages for a fixed tailstrike angle and/or minimized kink angle. Additionally, minimizing the fuselage kink angle for elongated aft fuselages allows the aft region of the cargo bay to extend further along the fuse fuselage while increasing the maximum straight-line payload length for a given overall aircraft length and tailstrike angle, as shown at least in FIGS. 6B and 6C.

Figure 6B:
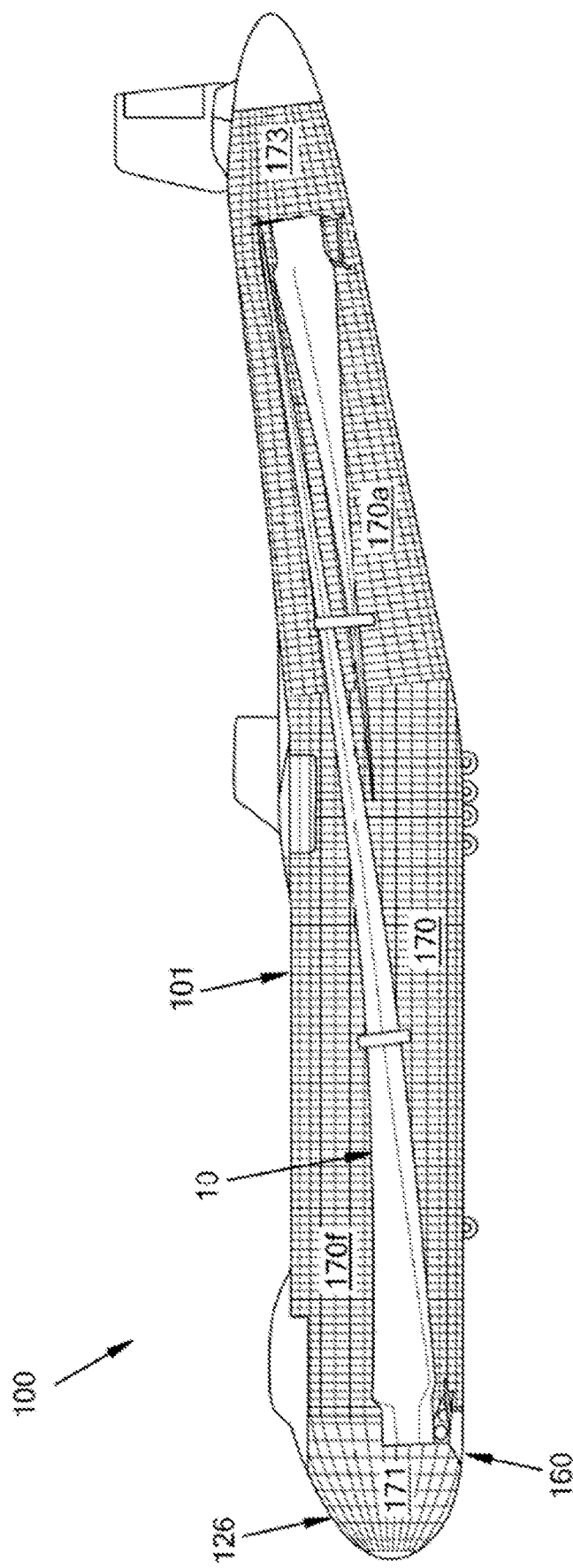
FIG. 6B is the side cross-sectional view of the aircraft of FIG. 6A with an exemplary payload disposed in the interior cargo bay.

FIG. 6B shows a side cross-sectional view of the fuselage 101 of the cargo aircraft 100 of FIG. 6A with a highly elongated payload 10 of two wind turbine blades 11A, 11B disposed substantially throughout the interior cargo bay 170 and extending from the forward end 171 of the forward region 170f to the aft end 173 of the aft region 170a. Having at least a portion of the aft region 170a being linearly connected to (e.g., within line of sight) of at least a portion of the forward region 170f enables the extension of the aft region 170a to result in an extension in the maximum overall length of a rigid payload capable of being carried inside the interior cargo bay 170. Wind turbine blades, however, are often able to be deflected slightly during transport and so examples of the present disclosure are especially suited to their transport as the ability to slightly deflect the payload 10 during transport enables even long maximum payload lengths to be achieved by further extending the aft end 173 of the aft region 170a beyond the line of sight of the forward-most end 171 of the forward region 170f.

Figure 6C:
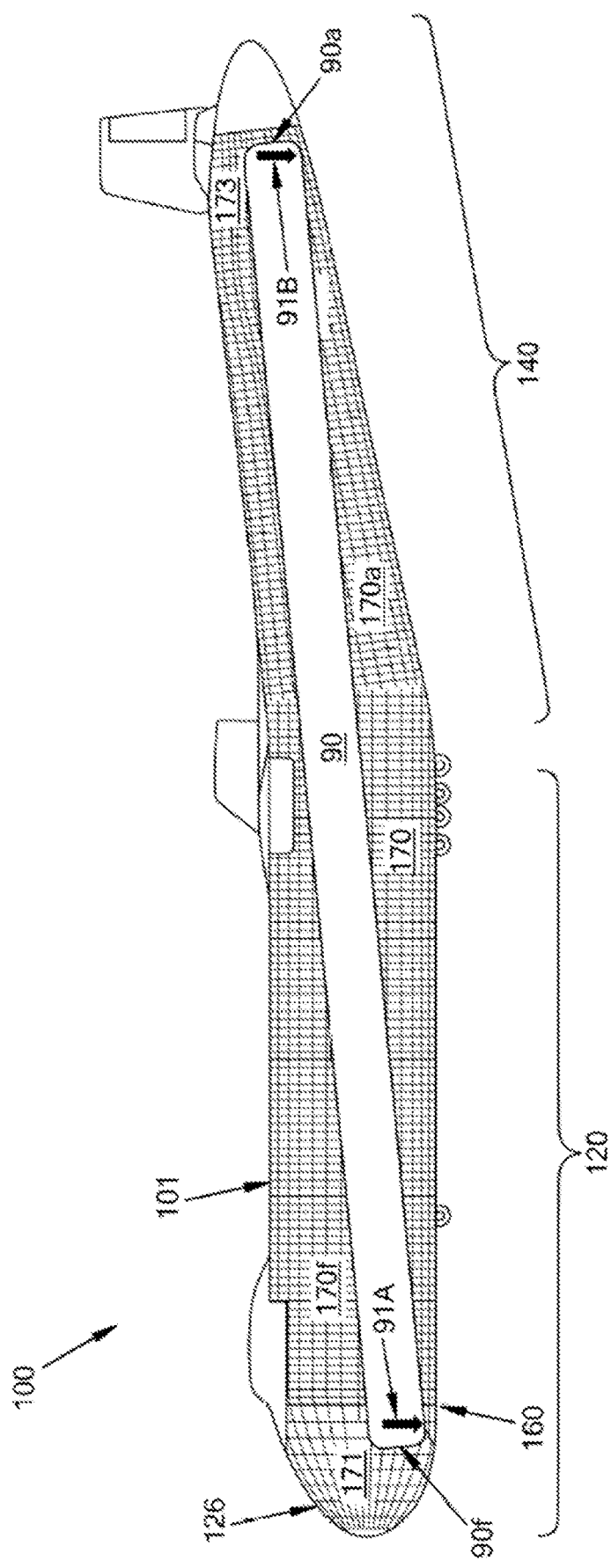
FIG. 6C is the side cross-sectional view of the aircraft of FIG. 6A with a schematic of an exemplary maximum-length payload disposed in the interior cargo bay.

FIG. 6C is the same cross-sectional view of the fuselage 101 of the cargo aircraft 100 of FIG. 6B with a maximum length rigid payload 90 secured in the cargo bay 170. A forward end 90f of the maximum length rigid payload 90 can be secured to the cantilevered tongue 160 in the forward end 171 of the forward region 170f with a first portion of the weight of the payload 90 (shown as vector 91A) being carried by the cantilevered tongue 160 and an aft end 90a of the maximum length rigid payload 90 can be secured to the aft end 173 of the aft region 170a with a second portion of the weight of the payload 90 (shown as vector 91B) being carried by the aft end 173 of the aft region 170a.

Figure 6D:
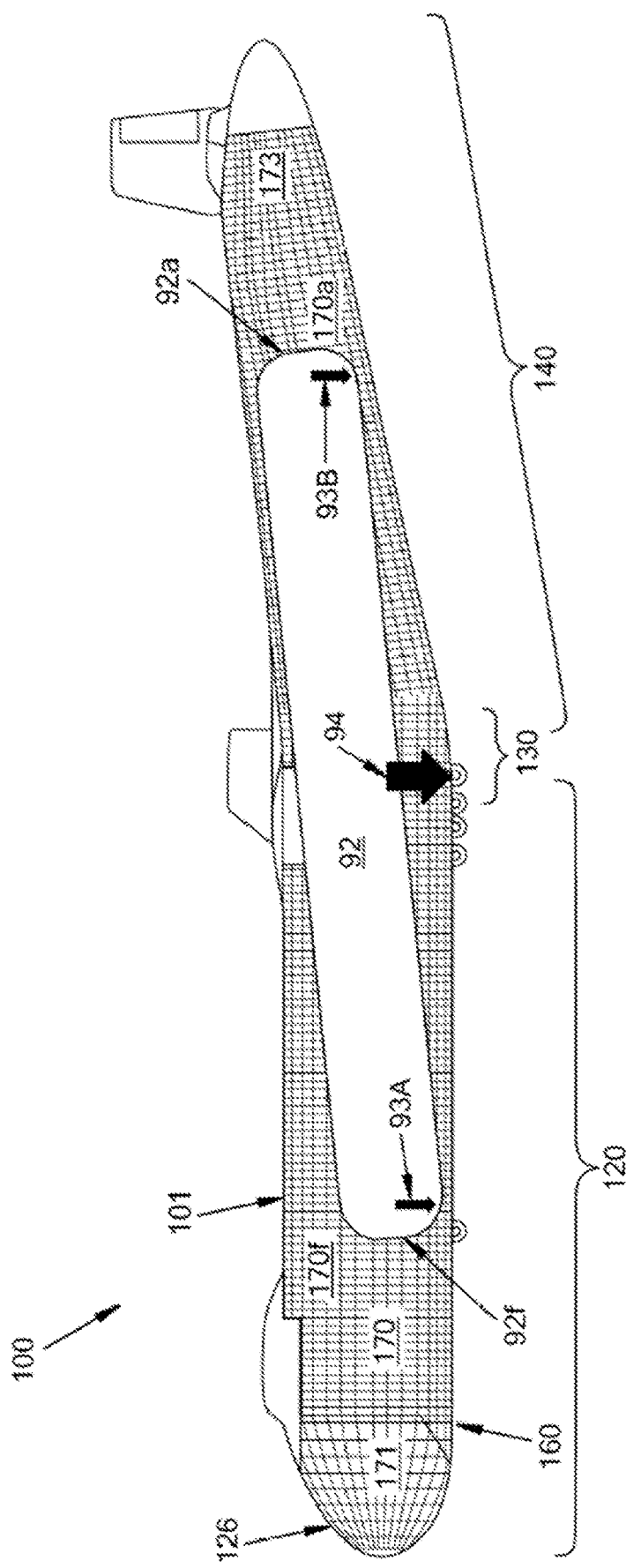
FIG. 6D is the side cross-sectional view of the aircraft of FIG. 6A with a schematic of an exemplary maximum-weight payload disposed in the interior cargo bay of the aircraft.

FIG. 6D is the same cross-sectional view of the fuselage 101 of the cargo aircraft 100 of FIG. 6A with a maximum weight payload 92 secured in the cargo bay 170. A forward end 92f of the maximum weight payload 92 can be secured in the forward region 170f of the interior cargo bay 170 with a first portion of the weight of the payload 92 (shown as vector 93A) being carried by the forward fuselage 120 and an aft end 92a of the maximum weight payload 92 can be secured in the aft region 170a of the interior cargo bay 170 with a second portion of the weight of the payload 92 (shown as vector 93B) being carried by the aft fuselage 140. Advantageously, the substantial length of the cargo bay 170 forward and aft of the a center-of-gravity of the aircraft 100 (e.g., approximately aligned with the kinked region 130) enables positioning of the maximum weight payload 92 such that the payload center-of-gravity (shown as vector 94) substantially close (i.e., within about 30% of wing Mean Aerodynamic Cord (MAC) or about 4% of total aircraft length) to or aligned with the center-of-gravity of the aircraft 100. In some examples, at least about 10% of the weight of maximum weight payload 92 is carried in the aft region 170a. In some examples of carrying a maximum weight payload, especially payloads approaching a maximum length, about 40% to about 50% could be carried in the aft region 170a in order to center the payload's center of gravity at a nominal location in the cargo bay 170.

Figure 7:
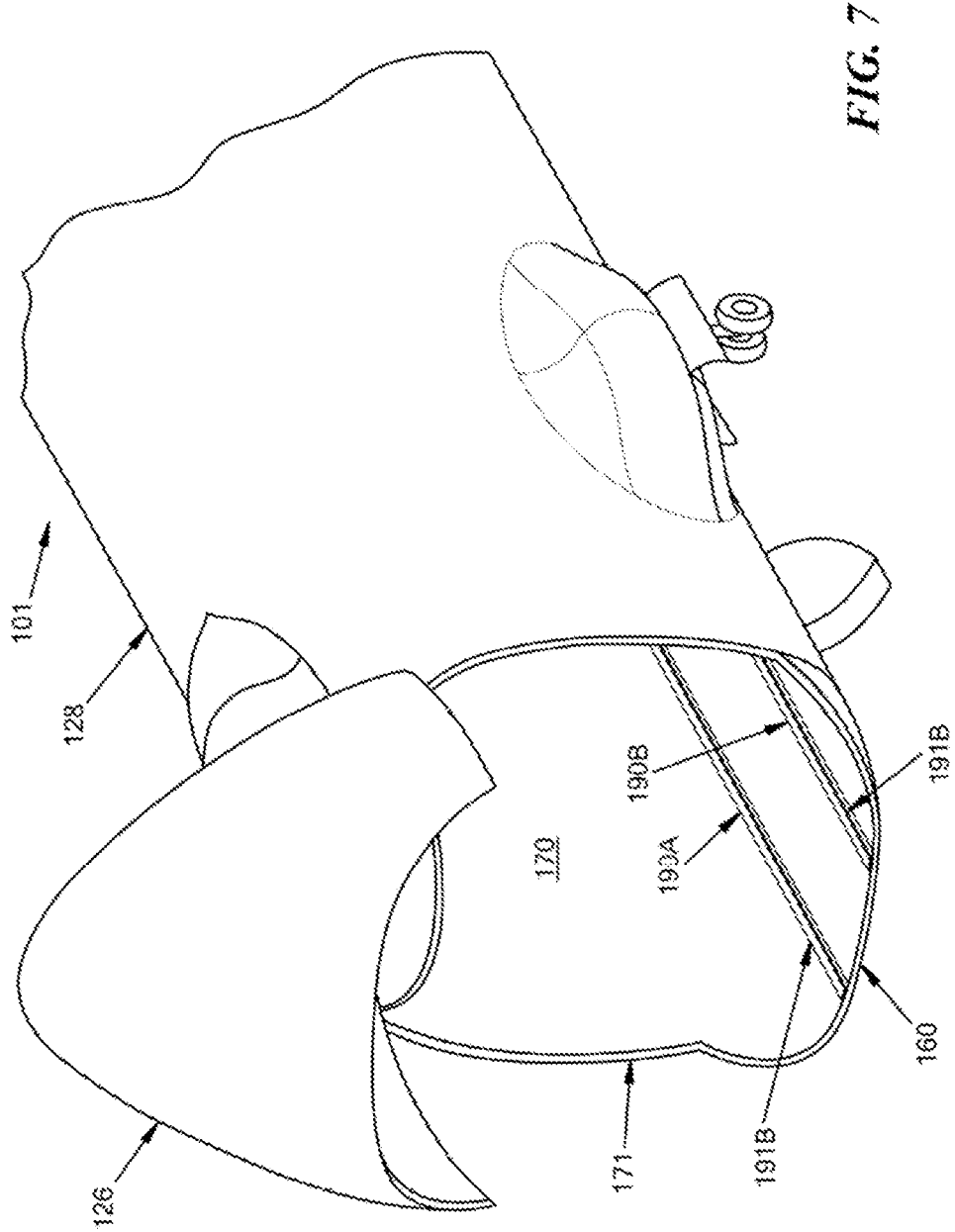
FIG. 7 is an isometric view of the aircraft of FIG. 6A illustrating a lower support system that extends along the interior cargo bay from a forward entrance to an aft section of the interior cargo bay in an aft portion of a fuselage of the aircraft.

FIG. 7 is a perspective view of the cargo aircraft 100 of FIG. 6A showing a lower support system 190A, 190B that extends along the cargo bay 170 from a forward entrance 171 to and through the aft section 170a (not visible) of the cargo bay 170 in the aft portion 140 (not visible) of the fuselage 101. The lower support system 190A, 190B can include forward portions 191A, 191B that extend forward along the cantilevered tongue 160 as well. In some examples, the lower support system 190A, 190B includes rails or tracks, or similar linear translation components, that enable a payload to be translated into the cargo bay 170 and all the way to the aft end of the aft region 170a of the cargo bay 170 from the cargo opening 171, for instance by having the lower support system 190A, 190B extend through nearly an entire length of the fixed portion 128 of the fuselage 101. In some examples, the lower support system 190A, 190B can be used to support and/or the payload during flight such that the lower support system 190A, 190B can hold substantially all of the weight of the payload.

Ram Air Turbine Configurations for Low Speed Flight

In contrast to previous solutions that utilize a ram air turbine that is configured to extend into air around the aircraft with a local airspeed that is approximately the airspeed of the aircraft, examples of the present disclosure include ram air turbine installations configured to deploy a ram air turbine into flow regions at or near the maximum airflow velocities induced by the aircraft during low speed air, for example, during a minimum airspeed takeoff or landing operation.

A ram air turbine (RAT), a device that extracts energy from the passing airflow and converts it to either electricity (e.g., by turning a generator) or hydraulic power (e.g., by turning a pump), or both electricity and hydraulic power or any other type of power, to provide an alternate power for control capabilities on an aircraft when the primary power source is unavailable (generally, a turbofan engine or other propulsor). A non-limiting example of a RAT is shown below in FIG. 8. In FIG. 8, a ram air turbine 800 is shown extending from a structural connection 188 to an aircraft fuselage, such as a fixed wing 182, 184 of the aircraft 100 of FIG. 1A. The ram air turbine 800 can include a structural support 810 extending from the structural connection 188 and a hub 820 that support a plurality of wind turbine blades 821 configured to spin the hub when the blades 821 are disposed in an airflow (e.g., as indicated by arrow 899). The rotation of the hub 820 can drive a number of different systems, such as an electric generator or a hydraulic pump, either of which can be disposed in the structural support 810.

The forces acting on the blades 821 of the ram air turbine 800 scale approximately in proportion to dynamic air pressure of the oncoming airflow 899, which scales with the square of the oncoming air speed. Therefore, typical ram air turbine 800 hardware is generally constrained to operation above a minimum aircraft speed where the forces acting upon the turbine blades 821 are sufficient to overcome friction and mechanical resistance to begin spinning the hub 820. However, these typical minimum ram air turbine 800 operation speeds are traditionally comparable to the takeoff and landing speeds of typical aircraft which are on the order of 130 knots of calibrated airspeed or above. The takeoff distance, landing distance, and required runway size of these typical aircraft is related closely to their takeoff and landing speeds. Therefore, for a large aircraft, such as the cargo aircraft 100 of FIG. 1A, to be able to operate into or out of much shorter runways, it is desirable to be able to take off and land at much lower speeds (e.g., 100 knots or lower), but this lower airspeed design can require a ram air turbine 800 with a minimum operating speed to be much lower than traditionally feasible. Accordingly, in order to utilize ram air turbines 800 having traditional performance characteristics, such as a minimum operational airspeed of 130 knots or higher a new ram air turbine configuration is disclosed.

Figure 9A:
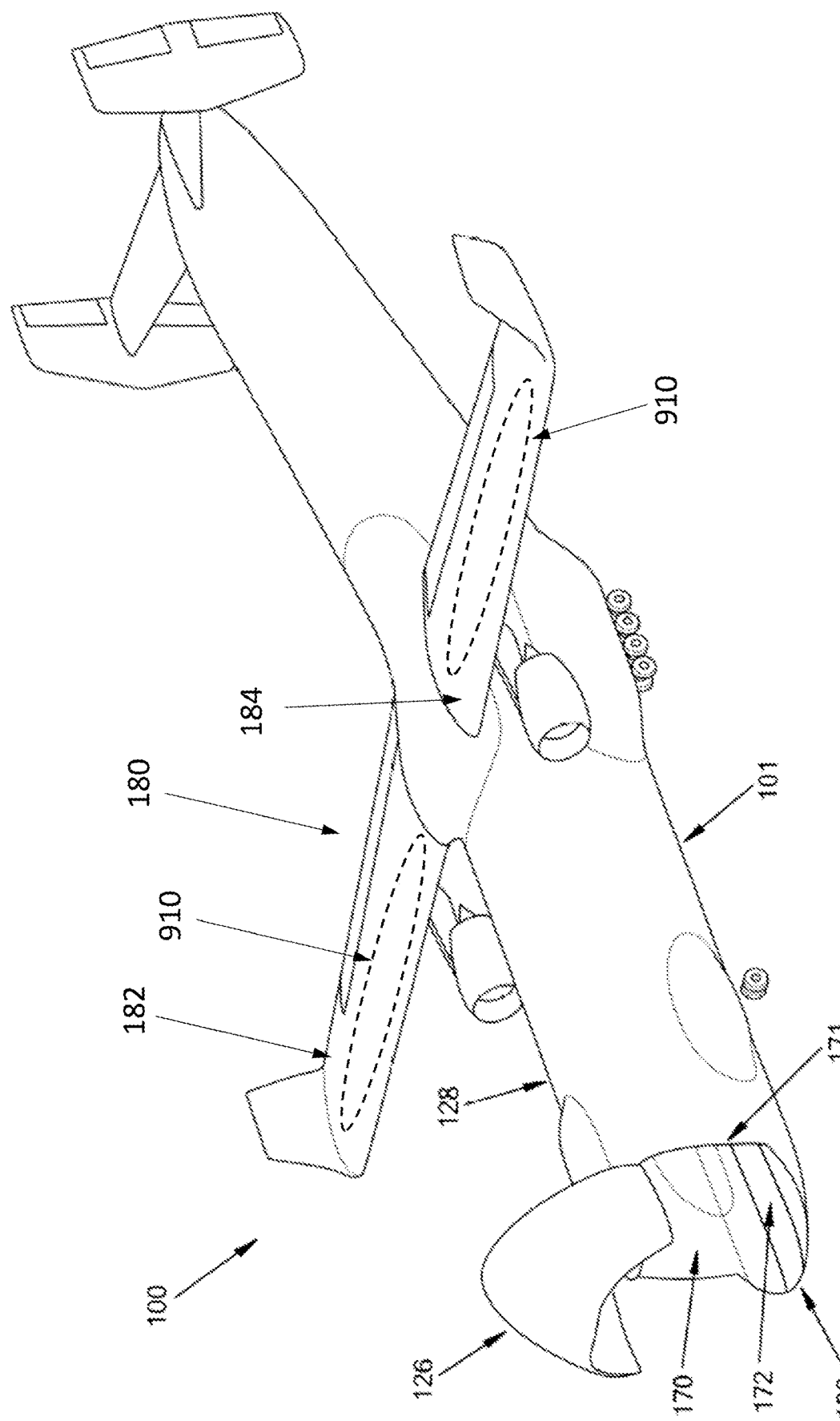
FIG. 9A is an isometric view of the aircraft of FIG. 1A illustrating the regions on the fixed wings where ram air turbines can be installed for maximum performance during low speed flight.
Figure 9B:
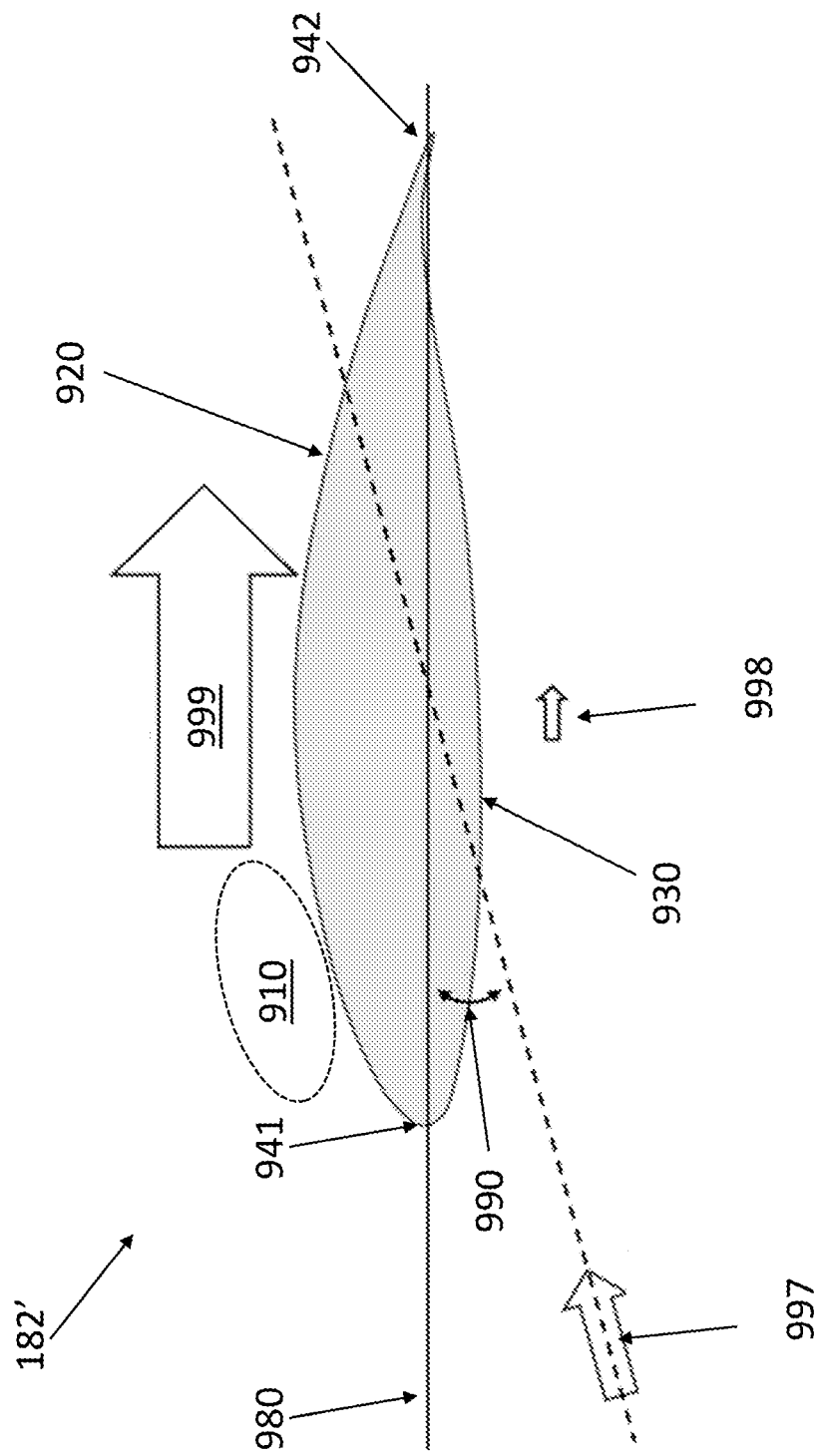
FIG. 9B is a cross section illustration of a fixed wing showing basic aerodynamic properties during flight.

During flight, all fixed-wing aircraft, such as the aircraft 100 of FIG. 9A, generate lift on specialized surfaces called lifting surfaces which include wings 182, 184, winglets, horizontal stabilizers, and vertical stabilizers, amongst others. These lifting surfaces create lift using specially tailored surface shapes, as shown in FIG. 9B, which accelerate flow faster on one side of the surface relative to the other side of the surface. FIG. 9B shows an example cross section 182' of a wing, such as either of the fixed wings 182, 184 of FIG. 9A. In FIG. 9B, the chord line 980 is shown horizontally, with the direction of the oncoming airflow (indicated by arrow 997) defining the angle of attack 990 therebetween. At lower speeds, lifting surfaces are usually inclined to a higher positive local angle of attack 990 relative to the oncoming airflow 997 by orienting them such that a pressure side 930 of the surface is rotated to be exposed forwards to the oncoming airflow 997, and a suction side 920 of the surface is rotated away and exposed less to the oncoming airflow 997. The amount of lift that a lifting surface creates, and the corresponding flow acceleration over the suction side of that lifting surface, increases with increasing angle of attack. In flight, this shape arrangement of FIG. 9B and angle of attack 990 results of an increased velocity of airflow 999 across the suction side 920 compared to the velocity of airflow 998 across the pressure side 930. The area of highest flow velocity 910 above the suction side 920 is dependent on the specific suction-side geometry, but it is closer to the leading edge 941 than the trailing edge 942 for essentially all airfoil designs in use today. This area 910 is illustrated in FIG. 9B, as well as in FIG. 9A as a region above the upper surface of each of the fixed wings 182, 184 just behind the leading edge.

The suction sides 920 of lifting surfaces can also be extremely sensitive locations, where small geometric disturbances can have large effects upon maximum achievable lift (and thus, stall speed, and thereby, takeoff and landing speeds, and required runway distances as a result), handling qualities, drag, and other critical aerodynamic quantities. Common occurrences such as airfield debris, ice, de-icing fluids, or damage are all likely to negatively impact these values.

FIGS. 10A-10C are non-limiting illustration of one example configuration of a ram air turbine 800 according to the present disclosure. FIG. 10A is a top view of the fixed upper wing 184 of the cargo aircraft 100 of FIG. 1A, with a ram air turbine 800 installed inboard of the engine 186 on the suction side 920 of the wing 184 such that the ram air turbine 800 is deployed into the area of highest flow velocity 910 above the suction side 920. FIG. 10B is a cross section front view of the fixed wing 184 of the aircraft 100 showing the ram air turbine 800 in a stowed configuration inside a compartment 1009 below the suction side 920 of the wing 184. FIG. 10C shows the deployment of the ram air turbine 800 from the stowed configuration of FIG. 10B to a deployed or extended configuration, where the ram air turbine 800 pivots laterally (e.g., along the path of arrow 1010) out of the compartment 1009 inside the fixed window 184 to dispose the turbine blades 821 of the ram air turbine 800 above the suction side 920 of the fixed wing 184.

Other configurations of the ram air turbine 800 are within the scope of this disclosure. For examples, a ram air turbines that is deployed from inside the wing 184 in a different direction, such as telescopically extending or translating, pivoting in another direction, or any other suitable deployment arrangement that would be immediately appreciated by one skilled in the art as being suitable for moving a ram air turbine 800 from a position inside the fuselage or wing and disposing the turbine blades 821 above the suction side of the fixed wing 184 or other lifting body.

Additionally, while FIGS. 10A-10C illustrate the ram air turbine 800 as being inboard of the engine 186, this is merely one possible location for the ram air turbine 800 and outboard of the engine 186 is suitable as well. In some examples, the aircraft can have additional engines inboard or outboard of the existing illustrated engine 186. Additionally, the ram air turbine 800 can be located inboards or outboards of any of those engines. Or the engines could be not present at all (fuselage mounted engines) or similarly could be mounted above the wings. Also, while FIGS. 10A-10C show the ram air turbine 800 located on the fixed wing 184, it is also within the scope of this disclosure to locate the ram air turbine 800 on other lifting bodies or surfaces, such as the horizontal stabilizer on the empennage 150 of aircraft 100 of FIG. 1A.

FIGS. 8 and 10A-10C illustrate the ram air turbine 800 as having a wind turbine design with open blades 821, however other ram air turbine configurations can be used, such as ducted fan blades that may be external or internal to the suction surface 820 (including inside the fuselage) in order to have high velocity air from above the suction side 920 ducted or otherwise directed across the blades of the ram air turbine.

Figure 11:
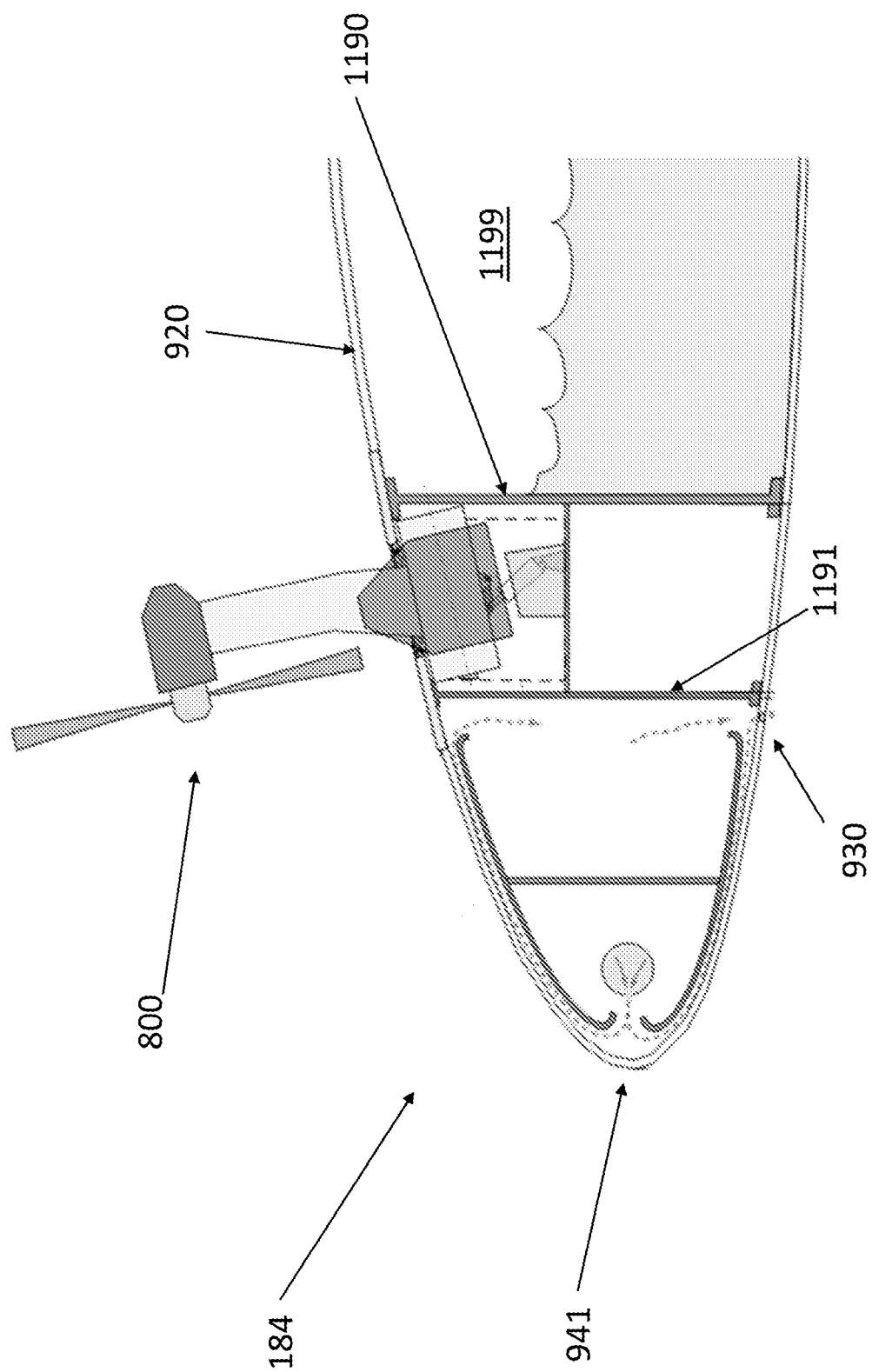
FIG. 11 is a cross section side view of the fixed wing of the aircraft of FIG. 10A showing the ram air turbine in a deployed configuration.

FIG. 11 is a cross section side view of the fixed wing 184 of the aircraft 100 of FIG. 10A showing the ram air turbine 800 in a deployed configuration. In FIG. 11, a forward portion of the fixed wing 184 is visible and includes a primary forward spar 1190 which defines a forward end of the primary wing box and a forward end of a fuel tank 1199. In FIG. 11, the ram air turbine 800 deployed from a position forward of the primary forward spar 1190. The wing 184 includes a structural member parallel to the forward spar 1190 that can, together with the primary forward spar 1190 define a compartment suitable for storage and deployment of the ram air turbine 800 near the leading edge 941 of the fixed wing 184. The location of the ram air turbine 800 forward of the primary forward spar 1190 enables the ram air turbine 800 to be supported against the primary forward spar 1190 as well be located near the leading edge 941 of the fixed wing 184 without compromising an existing structural wing configuration.

FIG. 11 shows the ram air turbine 800 located forward of the primary forward spar 1190, but other configurations are within the scope of this disclosure, such as aft of the primary forward spar 1190. Also, in some examples, the ram air turbine 800 can be supported by the skin of the wing 184 or other structural members, including structural members of the fuselage such that the ram air turbine 800 extends from the body of an aircraft having a lower wing configuration to dispose the turbine blades 821 above a suction surface 920 of one of the lower wings.

Examples of the present disclosure provides for a ram air turbine installations that are located on the suction side of a lifting surface. Example installations utilize the lifting surface's local flow acceleration to speeds above and beyond freestream speed, thereby allowing ram air turbine operation to continue to freestream speeds well below the rated minimum operating speed of the ram air turbine. Examples enable existing ram air turbine designs to be installed in configurations that allow aircraft to obtain safety certifications at minimum airspeed significantly lower than otherwise possible for a given ram air turbine in a traditional configuration where the ram air turbine experiences little to no increased airspeed when deployed. Computational investigations and sizing studies, presented in FIGS. 12-15, show that flow acceleration of well over 225% of freestream values are possible with minimal negative impacts. At the lowest speeds, the flow acceleration peaks due to increasing angle of attack and increasing wing lift coefficient, keeping the ram air turbine 800 turning for all flyable conditions; at higher speeds, the flow acceleration decreases due to decreasing angle of attack and decreasing wing lift coefficient, reducing governator load.

Figure 12:
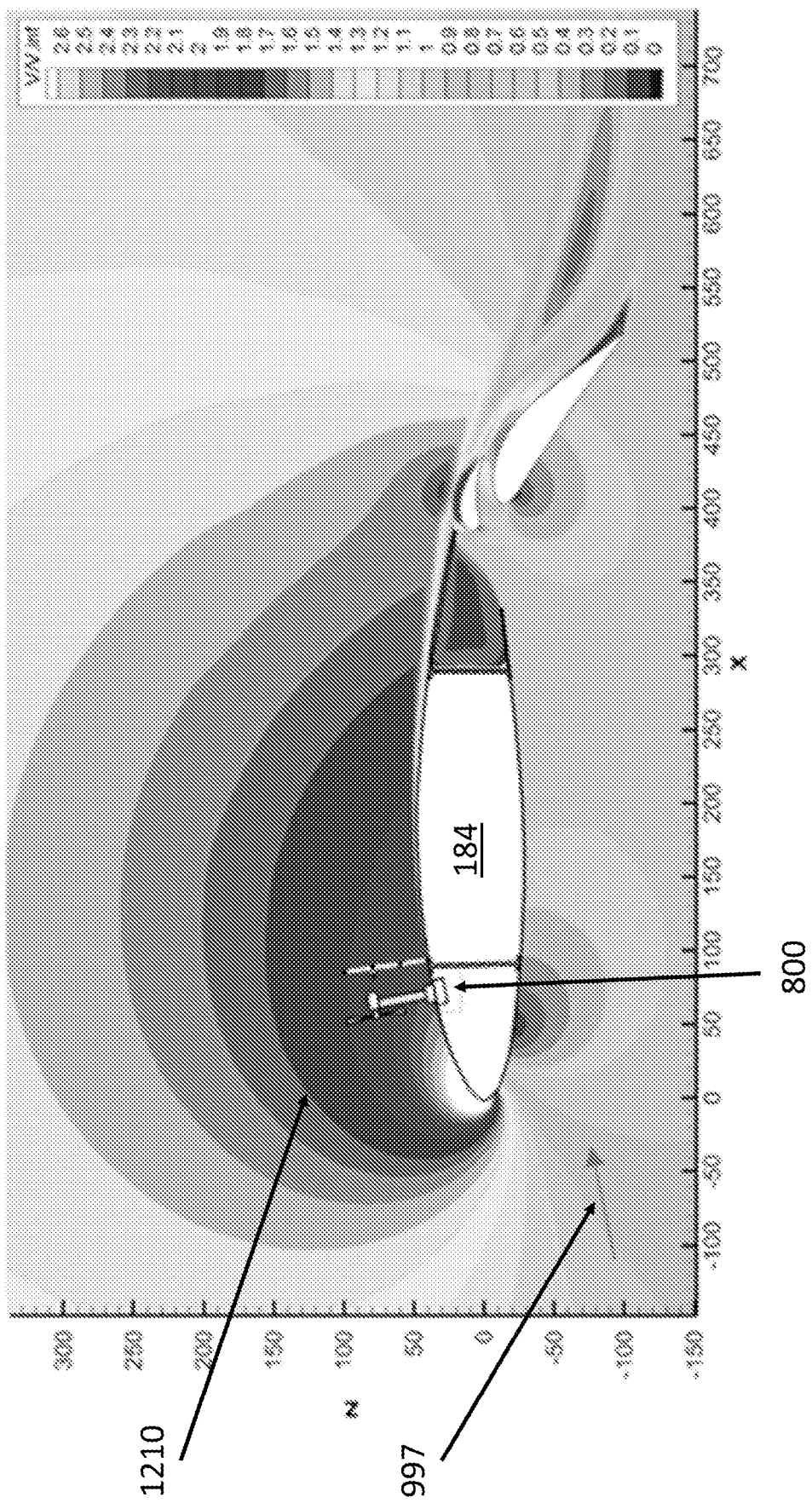
FIG. 12 is a 2D computational result of the ratio of local airspeed to aircraft airspeed around the fixed wing of the aircraft of FIG. 10A showing the ram air turbine in a deployed configuration, as located in an area with local flow acceleration.
Figure 13:
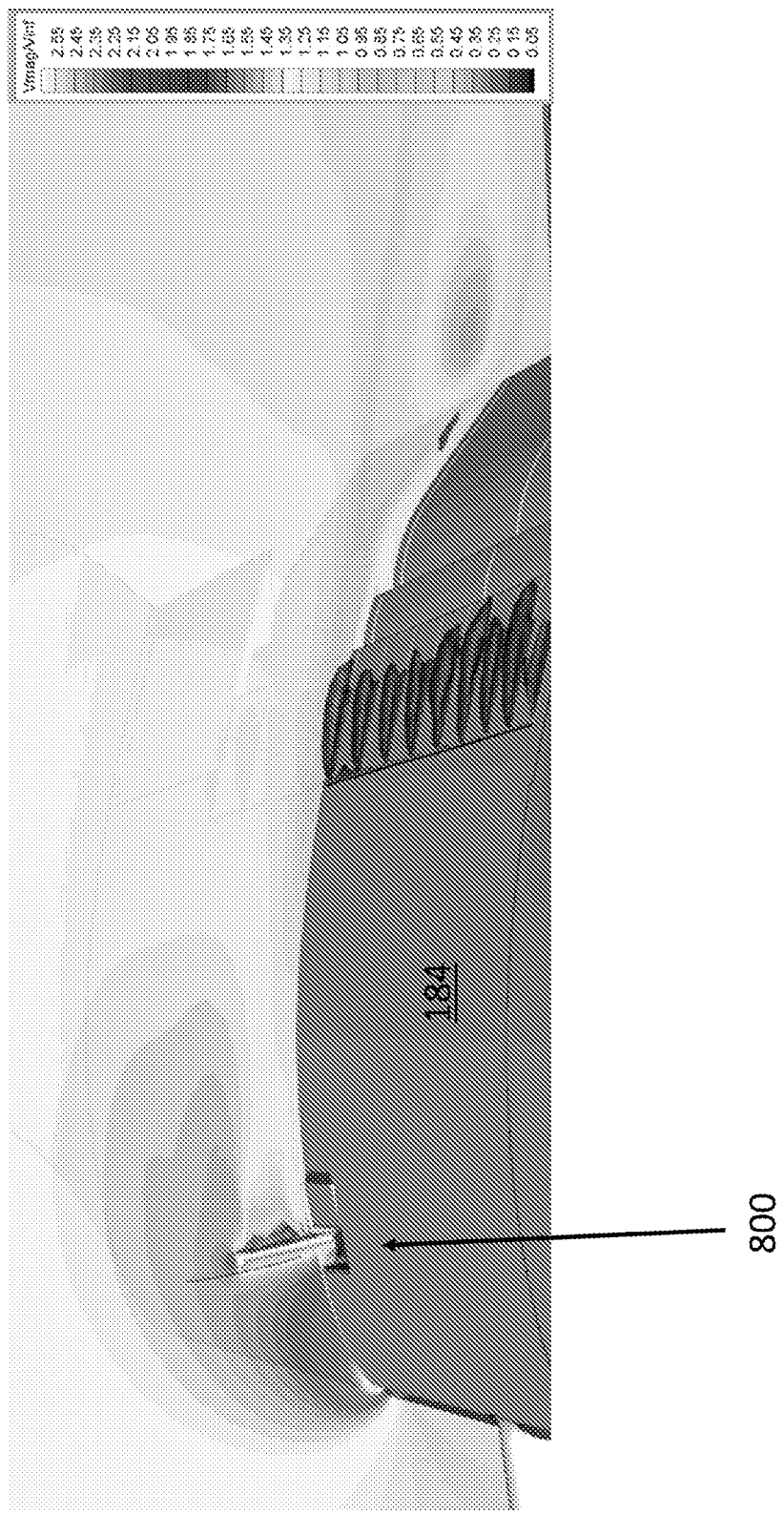
FIG. 13 is a 3D computational result of velocity magnitude above the upper surface of the fixed wing of the aircraft of FIG. 10A showing the ram air turbine in a deployed configuration, illustrating the local flow acceleration surrounding the deployed ram air turbine and the velocity defect downstream of the ram air turbine.
Figure 14:
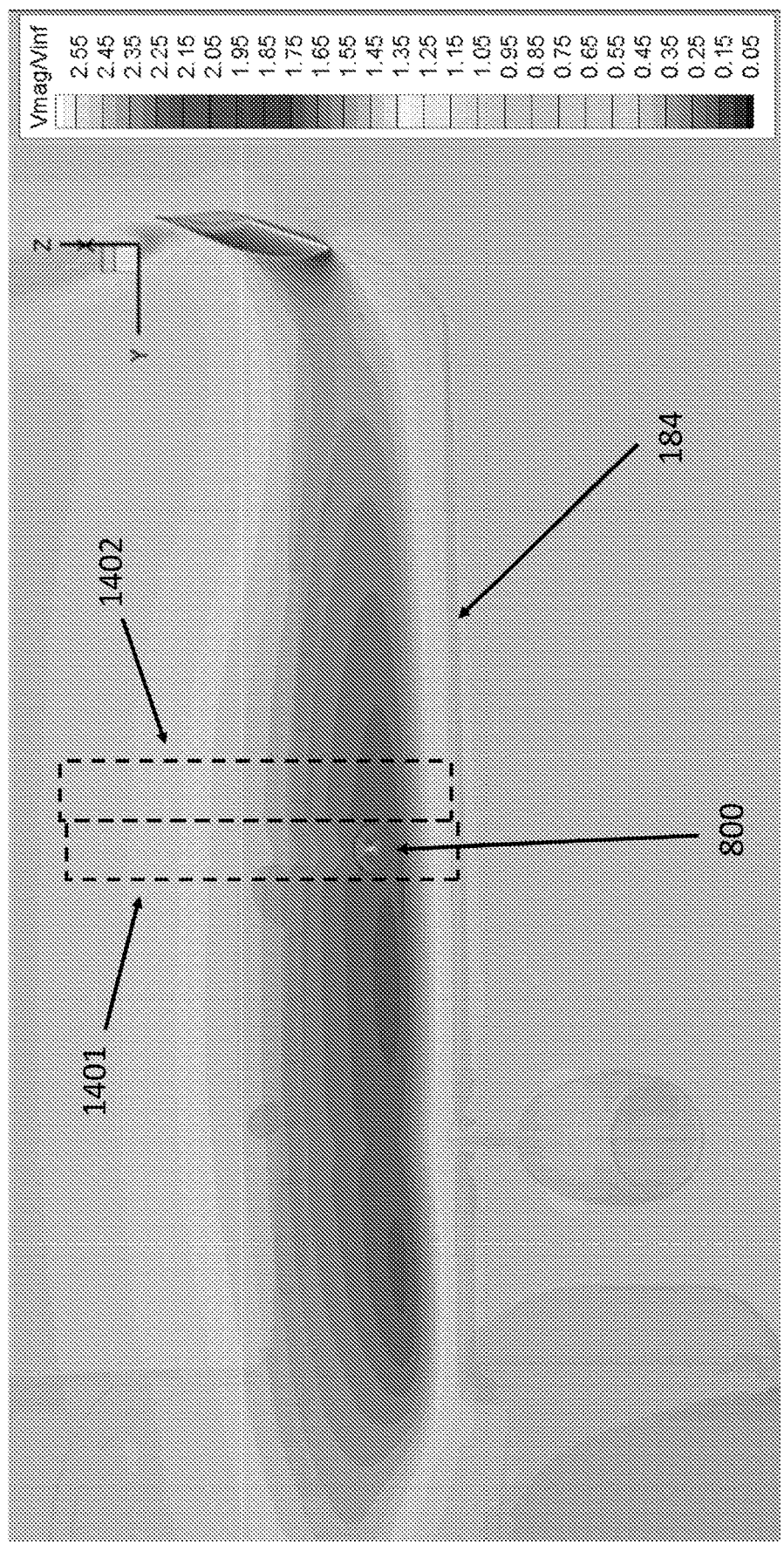
FIG. 14 is a 3D computational result of velocity magnitude above the upper surface of a fixed wing of the aircraft of FIG. 10A showing the ram air turbine in a deployed configuration.
Figure 15:
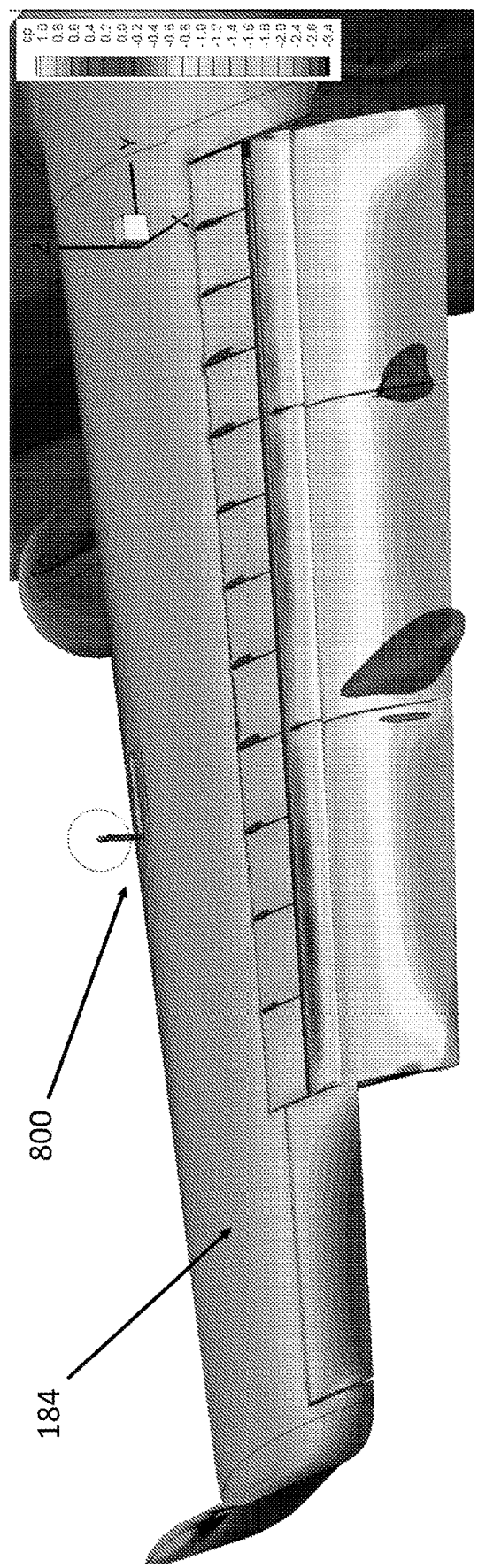
FIG. 15 is a 3D computational result of surface pressure coefficient on the upper surface of a fixed wing of the aircraft of FIG. 10A showing the ram air turbine in a deployed configuration.

Computational work, presented in FIGS. 12-15, shows a ram air turbine 800 installation on the suction side 920 of various lifting surfaces of a large aircraft has minimal negative impacts upon maximum achievable lift, drag, stall characteristics and handling qualities. The simulations were taken using a 3D model of an aircraft similar to the aircraft 100 of FIG. 1A at 1.1 times landing flap stall speed. A two-dimensional (2D) computational fluid dynamics (CFD) simulation of a deployed ram air turbine 800 is illustrated in FIG. 12, and a three-dimension (3D) CFD simulation of a deployed ram air turbine 800 is shown in FIGS. 13-15. FIGS. 12-15 show in various views that at a minimum airspeed flight condition reduced pressure present on the suction side of the lifting surface corresponds with local flow acceleration. FIGS. 12 and 15 illustrate a longitudinally trimmed steady-state flight condition at maximum landing weight and 110% of the flaps landing stall speed, that is, 65 knots and at 5,000 feet, and FIGS. 13 and 14 illustrate a similar configuration in a takeoff configuration at 69 knots. For the non-limiting example configuration illustrated and simulated by FIGS. 12-15, this minimum flight speed is well below 100 knots at maximum landing weight and even below 70 knots at minimum operating weight, with local flow speeds averaged over the blades of the ram air turbine 800 of well over 225% of freestream airspeeds.

In both FIG. 12 and FIG. 13 a ram air turbine 800 is simulated being deployed near the leading edge on the suction side of a fixed wing 182, 184 of a large cargo aircraft 100. In FIG. 12 it is shown that the entirety of the ram air turbine 800 is disposed within a region 1210 of airflow where the local airspeed is more than 1.7 times the oncoming airspeed 997 experienced by the wing 182. In FIG. 12, it is also shown that almost the entirety of the ram air turbine 800 is disposed within a region of airflow where the local airspeed is more than 2.0 times (i.e., 100% greater) the oncoming airspeed 997 experienced by the wing 182. For example, the oncoming airspeed 997 was approximately 65 knots, and the ram air turbine 800 is shown to experience airspeed only over 130 knots, which is above the example typical minimum airspeed requirement of a ram air turbine. Accordingly, a ram air turbine 800 with a 130 knot minimum airspeed would be able to meet this requirement during a 65 knot airspeed landing or takeoff operation of a large aircraft as illustrated in FIGS. 12 and 13.

FIG. 14 is a 3D computational result of local airspeed magnitude ratio to freestream speed on the upper surface of a fixed wing 184 of the aircraft 100 of FIG. 10A showing the ram air turbine 800 in a deployed configuration. In FIG. 14 the stalling speed of the wing 184 is analyzed in view of the presence of the ram air turbine 800. The airflow across the section 1401 of the wing 184 affected by the ram air turbine 800 was found to achieve an acceleration of 66% compared with 73% in an adjacent section 1402 without the ram air turbine, illustrating that the presence of an installed ram air turbine does not eliminate the local flow acceleration effect.

FIG. 15 is a 3D computational result of coefficient of pressure on the upper surface of a fixed wing 184 of the aircraft 100 of FIG. 10A showing the ram air turbine 800 in a deployed configuration. In FIG. 15 the black colored regions between adjacent spoiler panels and in between separate flap segments illustrate separation (the isocontours are of minimally negative U-velocity, indicating that these regions are actually moving forwards portions of separated, recirculating bubbles of airflow). The lack of a perceptible local change in surface pressure coefficient downstream of the deployed ram air turbine 800, and the lack of a change in separated flow near the wing surface downstream of the deployed ram air turbine, indicate that the ram air turbine 800 may be deployed and operational without causing a more broad impact to aircraft flight characteristics and the ability of the aircraft's continued safe flight and landing. Integrations of similar pressure coefficients over multiple conditions, including conditions at stall and into post-stall flight, indicate that there is a negligible drag increase, a negligible maximum lift decrease, and a small rolling moment change which is easily controlled by standard roll controls, such as the illustrated ailerons of the aircraft 100 of FIG. 1A.

While FIGS. 8-15 have illustrated a ram air turbine of a common design installed in a location near the leading edge of a primary fixed wing, one skilled in the art will appreciate that other types of ram air turbines (e.g., other types of air-powered emergency systems, generally) are compatible with examples of the present disclosure, which includes locations that are not near the leading edge of a fixed wing. Including, for example, locations on suction sides of other lifting bodies, such as canards or empennages having a geometry that generate sufficient (e.g., greater than 50%, or greater than 100%) airflow velocity increase across a region suitable for disposing a ram air turbine during a low-speed (e.g., 100 knots or less) takeoff or landing operation.

Examples of the above-described embodiments can include the following:
  1. An aircraft comprising:
    a fuselage;
    a lifting body connected to the fuselage and configured to provide a lifting force on the fuselage, the lifting body including a suction surface and a pressure surface disposed on opposite sides of the lifting body from each other, the suction surface extending from a leading edge of the lifting body to a trailing edge of the lifting body; and
    a ram air turbine coupled to the lifting body and configured to move between a retracted position where the ram air turbine is stowed inside the aircraft and an extended position where the ram air turbine is disposed above the suction surface of the lifting body.
2. The aircraft of claim 1, wherein the lifting body comprises at least part of a wing of the aircraft.
3. The aircraft of claim 2, wherein the suction surface comprises an upper surface of the wing.
4. The aircraft of claim 2 or 3,
    wherein the wing comprises a fuel tank, and
    wherein the ram air turbine, in the retracted position, is stowed forward of the fuel tank.
5. The aircraft of any of claims 2 to 4, wherein the ram air turbine is stowed in the retracted position forward of a front spar of the wing.
6. The aircraft of any of claims 2 to 5,
    wherein the wing comprises at least one engine, and
    wherein the ram air turbine is located along the wing at a location inboard of the at least one engine.
7. The aircraft of any of claims 1 to 6, wherein the suction surface of the lifting body is an upper surface.
8. The aircraft of any of claims 1 to 7, wherein the ram air turbine is configured to, in the extended position, provide at least one of electric power, mechanical power, or hydraulic power to a corresponding electric system or hydraulic system of the aircraft during a flight operation of the aircraft.
9. The aircraft of any of claims 1 to 8, wherein the ram air turbine comprises a plurality of turbine blades and an electrical generator configured to provide electric power to the aircraft or hydraulic pump configured to provide hydraulic pressure to the aircraft.
10. The aircraft of any of claims 1 to 9, wherein, in the extend position, the ram air turbine is located closer to the leading edge of the lifting body than to the trailing edge of the lifting body.
11. The aircraft of any of claims 1 to 10,
    wherein the lifting body is sized and shaped such that, in an operation of the aircraft, the lifting body generates a region of accelerated airflow above the suction surface, an airspeed in the region of accelerated airflow being higher than an incoming airspeed forward of the leading edge, and
    wherein the ram air turbine, in the extended position, is at least partially disposed in the region of accelerated airflow.
12. The aircraft of any of claims 1 to 11,
    wherein the ram air turbine comprises a plurality of turbine blades, and
    wherein, when the ram air turbine is in the extended position, the plurality of turbine blades are disposed in the region of accelerated airflow.
13. The aircraft of any of claims 1 to 12, wherein the aircraft is a fixed-wing aircraft.
14. The aircraft of any of claims 1 to 13, wherein the aircraft comprises an interior cargo bay configured to carrying a maximum payload length of at least approximately 250 feet.
15. The aircraft of any of claims 1 to 14,
    wherein the aircraft is configured to have a minimum takeoff speed, and
    wherein during a takeoff operation of the aircraft at the minimum takeoff speed, the ram air turbine in the extended position is at least partially disposed in a region of accelerated airflow having a velocity at least about 25% greater than the minimum takeoff speed.
16. The aircraft of claim 15, wherein the minimum takeoff speed is less than about 100 knots.
17. The aircraft of claim 15 or 16, wherein the ram air turbine in the extended position is at least partially disposed in a region of accelerated airflow having a velocity at least about 50% greater than the minimum takeoff speed.
18. The aircraft of any of claims 1 to 17,
    wherein the aircraft is configured to have a minimum landing speed, and
    wherein during a landing operation of the aircraft at the minimum landing speed, the ram air turbine in the extended position is at least partially disposed in a region of accelerated airflow having a velocity at least about 25% greater than the minimum landing speed.
19. The aircraft of claim 18, wherein the minimum landing speed is less than about 100 knots.
20. The aircraft of claim 18 or 19, wherein the ram air turbine in the extended position is at least partially disposed in a region of accelerated airflow having a velocity at least about 50% greater than the minimum landing speed.
21. The aircraft of any of claims 1 to 20, wherein the ram air turbine is stowed, in the retracted position, in a lateral orientation or longitudinal orientation.
22. The aircraft of claim 21, wherein the ram air turbine is configured to rotate approximately about a chord of the lifting body to move between the retracted position and the extended position.
23. A cargo aircraft, comprising:
    a fuselage defining a forward end, an aft end, and a continuous interior cargo bay that spans a majority of a length of the fuselage from the forward end to the aft end, the fuselage including:
        a forward portion containing a forward region of the continuous interior cargo bay, the forward portion defining a forward centerline along a longitudinal-lateral plane of the cargo aircraft,
        an aft portion containing an aft region of the continuous interior cargo bay, the aft portion defining an aft centerline extending above the longitudinal-lateral plane of the cargo aircraft, and
        a kinked portion forming a junction in the fuselage between the forward portion and the aft portion of the fuselage and between the forward and aft regions of the continuous interior cargo bay, the kinked portion containing a transition region of the continuous interior cargo bay and defining a bend angle between the forward centerline and the aft centerline;
    a first fixed wing extending from the fuselage in a first direction away from the fuselage;
    a second fixed wing extending from the fuselage in a second direction away from the fuselage, the second direction approximately symmetric about a longitudinal-vertical center plane of the cargo aircraft; and
    a ram air turbine coupled the first fixed wing and configured to move between a retracted position where the ram air turbine is stowed inside the cargo aircraft and an extended position where the ram air turbine is disposed above a suction surface of the first fixed wing.
24. The cargo aircraft of claim 23, wherein the cargo aircraft has an upper wing configuration with an upper wing surface extending across the top of the aircraft from the first fixed wing to the second fixed wing, the upper wing surface comprising the suction surface of the first fixed wing.

25. The cargo aircraft of claim 23 or 24,
   wherein the length of the fuselage is greater than 84 meters, and
   wherein the continuous interior cargo bay defines a maximum payload length of at least about 70 meters.

26. The cargo aircraft of any of claims 23 to 25,
   wherein the first fixed wing comprises at least one engine, and
   wherein the ram air turbine is located along the first fixed wing at a location inboard of the at least one engine.

27. The cargo aircraft of any of claims 23 to 26, wherein, in the extend position, the ram air turbine is located closer to the leading edge of the first fixed wing than to the trailing edge of the first fixed wing.

28. The cargo aircraft of any of claims 23 to 27,
   wherein the first fixed wing is sized and shaped such that, in an operation of the cargo aircraft, the first fixed wing generates a region of accelerated airflow above the suction surface, an airspeed in the region of accelerated airflow being higher than an incoming airspeed forward of the leading edge, and
   wherein the ram air turbine, in the extended position, is at least partially disposed in the region of accelerated airflow.

29. The cargo aircraft of any of claims 23 to 27,
   wherein the aircraft is configured to have a minimum takeoff speed and a minimum landing speed,
   wherein during a landing operation of the aircraft at the minimum landing speed or a takeoff operation of the aircraft at the minimum takeoff speed, the ram air turbine in the extended position is at least partially disposed in a region of accelerated airflow having a velocity at least about 25% greater than the respective minimum landing speed or the minimum takeoff speed.

30. The cargo aircraft of claim 29, wherein at least one of the minimum landing speed or the minimum takeoff speed is less than about 100 knots.

31. The cargo aircraft of claim 30, wherein during either of the landing operation of the aircraft at the minimum speed or the takeoff operation of the aircraft at the minimum speed, the ram air turbine in the extended position is at least partially disposed in a region of accelerated airflow having a velocity at least about 25% greater than the respective minimum landing speed or the minimum takeoff speed.

32. A method of operating a fixed-wing aircraft, the method comprising:
   deploying a ram air turbine from a suction surface of a lifting body connected to the fuselage while the lifting body is providing a lifting force on the fuselage, the lifting body including a suction surface and a pressure surface disposed on opposite sides of the lifting body from each other, the suction surface extending from a leading edge of the lifting body to a trailing edge of the lifting body,
   wherein the deploying moves the ram air turbine from a retracted position where the ram air turbine is stowed inside the aircraft to an extended position where the ram air turbine is disposed above the suction surface of the lifting body.

33. The method of claim 32, further comprising powering at least one of an electric system or a hydraulic system of the fixed-wing aircraft from use of the ram air turbine.

34. The method of claim 32 or 33, wherein the ram air turbine in the extended position is located closer to a leading edge of the lifting body than to a trailing edge of the lifting body.

35. The method of any of claims 32 to 34, wherein the ram air turbine in the retracted position is located forward of a fuel tank of the lifting body.

36. The method of any of claims 32 to 35, wherein deploying the ram air turbine occurs during at least one of a takeoff operation or a landing operation.

37. The method of claim 36,
   wherein the at least one of the takeoff operation or the landing operation comprises the aircraft traveling at an airspeed of less than about 100 knots and the lifting body generating a region of accelerated airflow over the suction surface having a velocity of at least about 25% greater than the airspeed of the aircraft, and
   wherein the ram air turbine in the extended position is at least partially disposed in the region of accelerated airflow.

One skilled in the art will appreciate further features and advantages of the disclosures based on the provided for descriptions and embodiments. Accordingly, the inventions are not to be limited by what has been particularly shown and described. For example, although the present disclosure provides for transporting large cargo, such as wind turbines, the present disclosures can also be applied to other types of large cargos or to smaller cargo. All publications and references cited herein are expressly incorporated herein by reference in their entirety.

What is claimed is:

1. An aircraft comprising:
   a fuselage;
   a lifting body connected to the fuselage and configured to provide a lifting force on the fuselage, the lifting body including a suction surface and a pressure surface disposed on opposite sides of the lifting body from each other, the suction surface extending from a leading edge of the lifting body to a trailing edge of the lifting body; and
   a ram air turbine coupled to the lifting body and configured to move between a retracted position where the ram air turbine is stowed inside the aircraft and an extended position where the ram air turbine is disposed above the suction surface of the lifting body,
   wherein the lifting body comprises at least part of a wing of the aircraft, and
   wherein the ram air turbine is stowed in the retracted position forward of a front spar of the wing.

2. The aircraft of claim 1, wherein the suction surface comprises an upper surface of the wing.

3. The aircraft of claim 1,
   wherein the wing comprises a fuel tank, and
   wherein the ram air turbine, in the retracted position, is stowed forward of the fuel tank.

4. The aircraft of claim 1,
   wherein the wing comprises at least one engine, and
   wherein the ram air turbine is located along the wing at a location inboard of the at least one engine.

5. The aircraft of claim 1, wherein the ram air turbine is configured to, in the extended position, provide at least one of electric power, mechanical power, or hydraulic power to a corresponding electric system or hydraulic system of the aircraft during a flight operation of the aircraft.

6. The aircraft of claim 1, wherein the ram air turbine comprises a plurality of wind turbine blades and an electrical generator configured to provide electric power to the aircraft or hydraulic pump configured to provide hydraulic pressure to the aircraft.

7. The aircraft of claim 1, wherein, in the extend position, the ram air turbine is located closer to the leading edge of the lifting body than to the trailing edge of the lifting body.

8. The aircraft of claim 1,
wherein the lifting body is sized and shaped such that, in an operation of the aircraft, the lifting body generates a region of accelerated airflow above the suction surface, an airspeed in the region of accelerated airflow being higher than an incoming airspeed forward of the leading edge, and
wherein the ram air turbine, in the extended position, is at least partially disposed in the region of accelerated airflow.

9. The aircraft of claim 8,
wherein the ram air turbine comprises a plurality of turbine blades, and
wherein, when the ram air turbine is in the extended position, the plurality of turbine blades are disposed in the region of accelerated airflow.

10. The aircraft of claim 1, wherein the aircraft is a fixed-wing aircraft.

11. The aircraft of claim 1, wherein the aircraft comprises an interior cargo bay configured to carrying a maximum payload length of at least approximately 250 feet.

12. The aircraft of claim 1,
wherein the aircraft is configured to have a minimum takeoff speed, and
wherein during a takeoff operation of the aircraft at the minimum takeoff speed, the ram air turbine in the extended position is at least partially disposed in a region of accelerated airflow having a velocity at least about 25% greater than the minimum takeoff speed.

13. The aircraft of claim 12, wherein the minimum takeoff speed is less than about 100 knots.

14. The aircraft of claim 12, wherein the ram air turbine in the extended position is at least partially disposed in a region of accelerated airflow having a velocity at least about 50% greater than the minimum takeoff speed.

15. The aircraft of claim 1,
wherein the aircraft is configured to have a minimum landing speed, and
wherein during a landing operation of the aircraft at the minimum landing speed, the ram air turbine in the extended position is at least partially disposed in a region of accelerated airflow having a velocity at least about 25% greater than the minimum landing speed.

16. The aircraft of claim 15, wherein the minimum landing speed is less than about 100 knots.

17. The aircraft of claim 15, wherein the ram air turbine in the extended position is at least partially disposed in a region of accelerated airflow having a velocity at least about 50% greater than the minimum landing speed.

18. The aircraft of claim 1, wherein the ram air turbine is stowed, in the retracted position, in a lateral orientation.

19. The aircraft of claim 18, wherein the ram air turbine is configured to rotate approximately about a chord of the lifting body to move between the retracted position and the extended position.

20. A cargo aircraft, comprising:
a fuselage defining a forward end, an aft end, and a continuous interior cargo bay that spans a majority of a length of the fuselage from the forward end to the aft end, the fuselage including:
a forward portion containing a forward region of the continuous interior cargo bay, the forward portion defining a forward centerline along a longitudinal-lateral plane of the cargo aircraft,
an aft portion containing an aft region of the continuous interior cargo bay, the aft portion defining an aft centerline extending above the longitudinal-lateral plane of the cargo aircraft, and
a kinked portion forming a junction in the fuselage between the forward portion and the aft portion of the fuselage and between the forward and aft regions of the continuous interior cargo bay, the kinked portion containing a transition region of the continuous interior cargo bay and defining a bend angle between the forward centerline and the aft centerline;
a first fixed wing extending from the fuselage in a first direction away from the fuselage;
a second fixed wing extending from the fuselage in a second direction away from the fuselage, the second direction approximately symmetric about a longitudinal-vertical center plane of the cargo aircraft; and
a ram air turbine coupled the first fixed wing and configured to move between a retracted position where the ram air turbine is stowed inside the first fixed wing and an extended position where the ram air turbine is disposed above a suction surface of the first fixed wing,
wherein the ram air turbine is stowed in the retracted position forward of a front spar of the first fixed wing.

21. The cargo aircraft of claim 20, wherein the cargo aircraft has an upper wing configuration with an upper wing surface extending across the top of the aircraft from the first fixed wing to the second fixed wing, the upper wing surface comprising the suction surface of the first fixed wing.

22. The cargo aircraft of claim 20,
wherein the length of the fuselage is greater than 84 meters, and
wherein the continuous interior cargo bay defines a maximum payload length of at least about 70 meters.

23. The cargo aircraft of claim 20,
wherein the first fixed wing comprises at least one engine, and
wherein the ram air turbine is located along the first fixed wing at a location inboard of the at least one engine.

24. The cargo aircraft of claim 20, wherein, in the extend position, the ram air turbine is located closer to the leading edge of the first fixed wing than to the trailing edge of the first fixed wing.

25. The cargo aircraft of claim 20,
wherein the first fixed wing is sized and shaped such that, in an operation of the cargo aircraft, the first fixed wing generates a region of accelerated airflow above the suction surface, an airspeed in the region of accelerated airflow being higher than an incoming airspeed forward of the leading edge, and
wherein the ram air turbine, in the extended position, is at least partially disposed in the region of accelerated airflow.

26. The cargo aircraft of claim 20,
wherein the aircraft is configured to have a minimum takeoff speed and a minimum landing speed,
wherein during a landing operation of the aircraft at the minimum landing speed or a takeoff operation of the aircraft at the minimum takeoff speed, the ram air turbine in the extended position is at least partially disposed in a region of accelerated airflow having a velocity at least about 25% greater than the respective minimum landing speed or the minimum takeoff speed.

27. The cargo aircraft of claim 26, wherein at least one of the minimum landing speed or the minimum takeoff speed is less than about 100 knots.

28. The cargo aircraft of claim 27, wherein during either of the landing operation of the aircraft at the minimum speed or the takeoff operation of the aircraft at the minimum speed, the ram air turbine in the extended position is at least partially disposed in a region of accelerated airflow having a velocity at least about 50% greater than the respective minimum landing speed or the minimum takeoff speed.

29. A method of operating a fixed-wing aircraft, the method comprising:
   deploying a ram air turbine from a suction surface of a lifting body connected to a fuselage of the fixed-wing aircraft while the lifting body is providing a lifting force on the fuselage, the lifting body including a suction surface and a pressure surface disposed on opposite sides of the lifting body from each other, the suction surface extending from a leading edge of the lifting body to a trailing edge of the lifting body,
   wherein the deploying moves the ram air turbine from a retracted position where the ram air turbine is stowed inside the fixed-wing aircraft to an extended position where the ram air turbine is disposed above the suction surface of the lifting body,
   wherein the lifting body comprises at least part of a wing of the fixed-wing aircraft, and
   wherein the ram air turbine is stowed in the retracted position forward of a front spar of the wing.

30. The method of claim 29, further comprising powering at least one of an electric system, a mechanical system, or a hydraulic system of the fixed-wing aircraft from use of the ram air turbine.

31. The method of claim 29, wherein the ram air turbine in the extended position is located closer to a leading edge of the lifting body than to a trailing edge of the lifting body.

32. The method of claim 29, wherein the ram air turbine in the retracted position is located forward of a fuel tank of the lifting body.

33. The method of claim 29, wherein deploying the ram air turbine occurs during at least one of a takeoff operation or a landing operation.

34. The method of claim 33,
   wherein the at least one of the takeoff operation or the landing operation comprises the fixed-wing aircraft traveling at an airspeed of less than about 100 knots and the lifting body generating a region of accelerated airflow over the suction surface having a velocity of at least about 25% greater than the airspeed of the fixed-wing aircraft, and
   wherein the ram air turbine in the extended position is at least partially disposed in the region of accelerated airflow.

\* \* \* \* \*